(12) United States Patent
Satterlee et al.

(10) Patent No.: US 7,565,549 B2
(45) Date of Patent: Jul. 21, 2009

(54) SYSTEM AND METHOD FOR THE MANAGED SECURITY CONTROL OF PROCESSES ON A COMPUTER SYSTEM

(75) Inventors: Thomas James Satterlee, Felton, CA (US); William Frank Hackenberger, Los Altos, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/824,986

(22) Filed: Jul. 3, 2007

(65) Prior Publication Data

US 2007/0260880 A1 Nov. 8, 2007

Related U.S. Application Data

(63) Continuation of application No. 10/336,299, filed on Jan. 3, 2003.

(60) Provisional application No. 60/345,432, filed on Jan. 4, 2002.

(51) Int. Cl.
G06F 11/30 (2006.01)
H04L 9/00 (2006.01)

(52) U.S. Cl. .................. 713/187; 713/161; 713/164; 713/165; 713/167; 713/181; 713/182; 713/188; 713/193; 713/194; 726/1; 726/2; 726/22; 726/24

(58) Field of Classification Search .............. 726/22, 726/24; 713/164, 165, 167, 187
See application file for complete search history.

(56) References Cited

U.S. PATENT DOCUMENTS 4,223,380 A 9/1980 Antonaccio et al.
4,400,769 A 8/1983 Kaneda et al.

(Continued)

FOREIGN PATENT DOCUMENTS

EP 0 636 977 5/2001

(Continued)

OTHER PUBLICATIONS

Essex, David, E-Sleuths Make Net Safe for E-Commerce, Computerworld, Jun. 2000, pp. 1-2.

(Continued)

*Primary Examiner*—Kambiz Zand
*Assistant Examiner*—Jenise E Jackson
(74) *Attorney, Agent, or Firm*—King & Spalding LLP

(57) ABSTRACT

Managing and controlling the execution of software programs with a computing device to protect the computing device from malicious activities. A protector system implements a two-step process to ensure that software programs do not perform malicious activities which may damage the computing device or other computing resources to which the device is coupled. In the first phase, the protector system determines whether a software program has been previously approved and validates that the software program has not been altered. If the software program is validated during the first phase, this will minimize or eliminate security monitoring operations while the software program is executing during the second phase. If the software program cannot be validated, the protector system enters the second phase and detects and observes executing activities at the kernel level of the operating system so that suspicious actions can be anticipated and addressed before they are able to do harm to the computing device.

12 Claims, 9 Drawing Sheets

U.S. PATENT DOCUMENTS

| | | | |
|---|---|---|---|
| 4,672,609 A | 6/1987 | Humphrey et al. |
| 4,773,028 A | 9/1988 | Tallman |
| 4,819,234 A | 4/1989 | Huber |
| 4,975,950 A | 12/1990 | Lentz |
| 5,032,979 A | 7/1991 | Hecht et al. |
| 5,121,345 A | 6/1992 | Lentz |
| 5,204,966 A | 4/1993 | Wittenberg et al. |
| 5,210,704 A | 5/1993 | Husseiny |
| 5,274,824 A | 12/1993 | Howarth |
| 5,278,901 A | 1/1994 | Shieh et al. |
| 5,309,562 A | 5/1994 | Li |
| 5,311,593 A | 5/1994 | Carmi |
| 5,345,595 A | 9/1994 | Johnson et al. |
| 5,347,450 A | 9/1994 | Nugent |
| 5,353,393 A | 10/1994 | Bennett et al. |
| 5,359,659 A | 10/1994 | Rosenthal |
| 5,371,852 A | 12/1994 | Attanasio et al. |
| 5,398,196 A | 3/1995 | Chambers |
| 5,414,833 A | 5/1995 | Hershey et al. |
| 5,440,723 A | 8/1995 | Arnold et al. |
| 5,452,442 A | 9/1995 | Kephart |
| 5,454,074 A | 9/1995 | Hartel et al. |
| 5,475,839 A | 12/1995 | Watson et al. |
| 5,511,184 A | 4/1996 | Lin |
| 5,515,508 A | 5/1996 | Pettus et al. |
| 5,522,026 A | 5/1996 | Records et al. |
| 5,539,659 A | 7/1996 | McKee et al. |
| 5,557,742 A | 9/1996 | Smaha et al. |
| 5,586,260 A | 12/1996 | Hu |
| 5,590,331 A | 12/1996 | Lewis et al. |
| 5,606,668 A | 2/1997 | Shwed |
| 5,623,600 A | 4/1997 | Ji et al. |
| 5,623,601 A | 4/1997 | Vu |
| 5,630,061 A | 5/1997 | Richter et al. |
| 5,649,095 A | 7/1997 | Cozza |
| 5,649,185 A | 7/1997 | Antognini et al. |
| 5,675,711 A | 10/1997 | Kephart et al. |
| 5,696,486 A | 12/1997 | Poliquin et al. |
| 5,696,822 A | 12/1997 | Nachenberg |
| 5,706,210 A | 1/1998 | Kumano et al. |
| 5,715,395 A | 2/1998 | Brabson et al. |
| 5,734,697 A | 3/1998 | Jabbarnezhad |
| 5,745,692 A | 4/1998 | Lohmann, II et al. |
| 5,748,098 A | 5/1998 | Grace |
| 5,761,504 A | 6/1998 | Corrigan et al. |
| 5,764,887 A | 6/1998 | Kells et al. |
| 5,764,890 A | 6/1998 | Glasser et al. |
| 5,765,030 A | 6/1998 | Nachenberg et al. |
| 5,774,727 A | 6/1998 | Walsh et al. |
| 5,787,177 A | 7/1998 | Leppek |
| 5,790,799 A | 8/1998 | Mogul |
| 5,796,942 A | 8/1998 | Esbensen |
| 5,798,706 A | 8/1998 | Kraemer et al. |
| 5,812,763 A | 9/1998 | Teng |
| 5,815,574 A | 9/1998 | Fortinsky |
| 5,822,517 A | 10/1998 | Dotan |
| 5,826,013 A | 10/1998 | Nachenberg |
| 5,828,833 A | 10/1998 | Belville et al. |
| 5,832,208 A | 11/1998 | Chen et al. |
| 5,832,211 A | 11/1998 | Blakley et al. |
| 5,835,726 A | 11/1998 | Shwed et al. |
| 5,838,903 A | 11/1998 | Blakely et al. |
| 5,842,002 A | 11/1998 | Schnurer et al. |
| 5,845,067 A | 12/1998 | Porter et al. |
| 5,848,233 A | 12/1998 | Radia et al. |
| 5,854,916 A | 12/1998 | Nachenberg |
| 5,857,191 A | 1/1999 | Blackwell, Jr. et al. |
| 5,864,665 A | 1/1999 | Tran |
| 5,864,803 A | 1/1999 | Nussbaum |
| 5,872,915 A | 2/1999 | Dykes et al. |
| 5,872,978 A | 2/1999 | Hoskins |
| 5,875,296 A | 2/1999 | Shi et al. |
| 5,878,420 A | 3/1999 | de la Salle |
| 5,881,236 A | 3/1999 | Dickey |
| 5,884,033 A | 3/1999 | Duvall et al. |
| 5,892,903 A | 4/1999 | Klaus |
| 5,899,999 A | 5/1999 | De Bonet |
| 5,905,859 A | 5/1999 | Holloway et al. |
| 5,907,834 A | 5/1999 | Kephart et al. |
| 5,919,257 A | 7/1999 | Trostle |
| 5,919,258 A | 7/1999 | Kayashima et al. |
| 5,922,051 A | 7/1999 | Sidey |
| 5,925,126 A | 7/1999 | Hsieh |
| 5,931,946 A | 8/1999 | Terada et al. |
| 5,940,591 A | 8/1999 | Boyle et al. |
| 5,948,104 A | 9/1999 | Gluck et al. |
| 5,950,012 A | 9/1999 | Shiell et al. |
| 5,961,644 A | 10/1999 | Kurtzberg et al. |
| 5,964,839 A | 10/1999 | Johnson et al. |
| 5,964,889 A | 10/1999 | Nachenberg |
| 5,974,237 A | 10/1999 | Shurmer et al. |
| 5,974,457 A | 10/1999 | Waclawsky et al. |
| 5,978,917 A | 11/1999 | Chi |
| 5,983,270 A | 11/1999 | Abraham et al. |
| 5,983,348 A | 11/1999 | Ji |
| 5,983,350 A | 11/1999 | Minear et al. |
| 5,987,606 A | 11/1999 | Cirasole et al. |
| 5,987,610 A | 11/1999 | Franczek et al. |
| 5,987,611 A | 11/1999 | Freund |
| 5,991,856 A | 11/1999 | Spilo et al. |
| 5,991,881 A | 11/1999 | Conklin et al. |
| 5,999,711 A | 12/1999 | Misra et al. |
| 5,999,723 A | 12/1999 | Nachenberg |
| 6,003,132 A | 12/1999 | Mann |
| 6,006,016 A | 12/1999 | Faigon et al. |
| 6,009,467 A | 12/1999 | Ratcliff et al. |
| 6,014,645 A | 1/2000 | Cunningham |
| 6,016,553 A | 1/2000 | Schneider et al. |
| 6,021,510 A | 2/2000 | Nachenberg |
| 6,026,442 A | 2/2000 | Lewis et al. |
| 6,029,256 A | 2/2000 | Kouznetsov |
| 6,035,323 A | 3/2000 | Narayen et al. |
| 6,035,423 A | 3/2000 | Hodges et al. |
| 6,041,347 A | 3/2000 | Harsham et al. |
| 6,052,709 A | 4/2000 | Paul |
| 6,061,795 A | 5/2000 | Dircks et al. |
| 6,067,410 A | 5/2000 | Nachenberg |
| 6,070,190 A | 5/2000 | Reps et al. |
| 6,070,244 A | 5/2000 | Orchier et al. |
| 6,073,172 A | 6/2000 | Frailong et al. |
| 6,081,894 A | 6/2000 | Mann |
| 6,085,224 A | 7/2000 | Wagner |
| 6,088,803 A | 7/2000 | Tso et al. |
| 6,088,804 A | 7/2000 | Hill et al. |
| 6,092,194 A | 7/2000 | Touboul |
| 6,094,731 A | 7/2000 | Waldin et al. |
| 6,098,173 A | 8/2000 | Elgressy et al. |
| 6,104,783 A | 8/2000 | DeFino |
| 6,108,799 A | 8/2000 | Boulay et al. |
| 6,118,940 A | 9/2000 | Alexander, III et al. |
| 6,119,165 A | 9/2000 | Li et al. |
| 6,119,234 A | 9/2000 | Aziz et al. |
| 6,122,738 A | 9/2000 | Millard |
| 6,144,961 A | 11/2000 | de la Salle |
| 6,154,844 A | 11/2000 | Touboul et al. |
| 6,161,109 A | 12/2000 | Matamoros et al. |
| 6,167,520 A | 12/2000 | Touboul |
| 6,173,413 B1 | 1/2001 | Slaughter et al. |
| 6,185,689 B1 | 2/2001 | Todd, Sr. et al. |
| 6,195,687 B1 | 2/2001 | Greaves et al. |
| 6,199,181 B1 | 3/2001 | Rechef et al. |
| 6,205,552 B1 | 3/2001 | Fudge |
| 6,220,768 B1 | 4/2001 | Barroux |
| 6,226,372 B1 | 5/2001 | Beebe et al. |

| | | | | | | |
|---|---|---|---|---|---|---|
| 6,230,288 | B1 | 5/2001 | Kuo et al. | 6,708,212 B2 | 3/2004 | Porras et al. |
| 6,266,773 | B1 | 7/2001 | Kisor et al. | 6,711,127 B1 | 3/2004 | Gorman et al. |
| 6,266,774 | B1 | 7/2001 | Sampath et al. | 6,711,615 B2 | 3/2004 | Porras et al. |
| 6,271,840 | B1 | 8/2001 | Finseth et al. | 6,718,383 B1 | 4/2004 | Hebert |
| 6,272,641 | B1 | 8/2001 | Ji | 6,721,806 B2 | 4/2004 | Boyd et al. |
| 6,275,938 | B1 | 8/2001 | Bond et al. | 6,725,377 B1 | 4/2004 | Kouznetsov |
| 6,275,942 | B1 | 8/2001 | Bernhard et al. | 6,725,378 B1 | 4/2004 | Schuba et al. |
| 6,278,886 | B1 | 8/2001 | Hwang | 6,775,780 B1 | 8/2004 | Muttik |
| 6,279,113 | B1 | 8/2001 | Vaidya | 6,792,144 B1 | 9/2004 | Yan et al. |
| 6,282,546 | B1 | 8/2001 | Gleichauf et al. | 6,792,546 B1 | 9/2004 | Shanklin et al. |
| 6,298,445 | B1 | 10/2001 | Shostack et al. | 6,816,973 B1 | 11/2004 | Gleichauf et al. |
| 6,301,668 | B1 | 10/2001 | Gleichauf et al. | 6,839,850 B1 | 1/2005 | Campbell et al. |
| 6,314,520 | B1 | 11/2001 | Schell et al. | 6,851,057 B1 | 2/2005 | Nachenberg |
| 6,314,525 | B1 | 11/2001 | Mahalingham et al. | 6,871,284 B2 | 3/2005 | Cooper et al. |
| 6,321,338 | B1 | 11/2001 | Porras et al. | 6,886,102 B1 | 4/2005 | Lyle |
| 6,324,627 | B1 | 11/2001 | Kricheff et al. | 6,889,168 B2 | 5/2005 | Hartley et al. |
| 6,324,647 | B1 | 11/2001 | Bowman-Amuah | 6,912,676 B1 | 6/2005 | Gusler et al. |
| 6,324,656 | B1 | 11/2001 | Gleichauf et al. | 2001/0034847 A1 | 10/2001 | Gaul, Jr. |
| 6,334,213 | B1 * | 12/2001 | Li .................. 717/170 | 2002/0032717 A1 | 3/2002 | Malan et al. |
| 6,338,141 | B1 | 1/2002 | Wells | 2002/0032793 A1 | 3/2002 | Malan et al. |
| 6,347,374 | B1 | 2/2002 | Drake et al. | 2002/0032880 A1 | 3/2002 | Poletto et al. |
| 6,353,385 | B1 | 3/2002 | Molini et al. | 2002/0035698 A1 | 3/2002 | Malan et al. |
| 6,357,008 | B1 | 3/2002 | Nachenberg | 2002/0042886 A1 | 4/2002 | Lahti et al. |
| 6,377,994 | B1 | 4/2002 | Ault et al. | 2002/0083331 A1 | 6/2002 | Krumel |
| 6,396,845 | B1 | 5/2002 | Sugita | 2002/0083334 A1 | 6/2002 | Rogers et al. |
| 6,397,242 | B1 | 5/2002 | Devine et al. | 2002/0138753 A1 | 9/2002 | Munson |
| 6,397,245 | B1 | 5/2002 | Johnson, II et al. | 2002/0144156 A1 | 10/2002 | Copeland, III |
| 6,405,318 | B1 | 6/2002 | Rowland | 2002/0184520 A1 * | 12/2002 | Bush et al. ................. 713/200 |
| 6,405,364 | B1 | 6/2002 | Bowman-Amuah | 2003/0037136 A1 | 2/2003 | Labovitz et al. |
| 6,408,391 | B1 | 6/2002 | Huff et al. | 2003/0088791 A1 | 5/2003 | Porras et al. |
| 6,415,321 | B1 | 7/2002 | Gleichauf et al. | 2003/0101381 A1 | 5/2003 | Mateev et al. |
| 6,429,952 | B1 | 8/2002 | Olbricht | 2003/0212903 A1 | 11/2003 | Porras et al. |
| 6,434,615 | B1 | 8/2002 | Dinh et al. | 2004/0010718 A1 | 1/2004 | Porras et al. |
| 6,438,600 | B1 | 8/2002 | Greenfield et al. | 2005/0021994 A1 | 1/2005 | Barton et al. |
| 6,445,822 | B1 | 9/2002 | Crill et al. | | | |
| 6,453,345 | B2 | 9/2002 | Trcka et al. | | | |
| 6,453,346 | B1 | 9/2002 | Garg et al. | | | |

FOREIGN PATENT DOCUMENTS

| | | |
|---|---|---|
| EP | 0 985 995 | 8/2003 |
| WO | WO 93/25024 | 5/1993 |
| WO | WO 98/41919 | 9/1998 |
| WO | WO 99/00720 | 1/1999 |
| WO | WO 99/13427 | 3/1999 |
| WO | WO 99/15966 | 4/1999 |
| WO | WO 99/50734 | 10/1999 |
| WO | WO 99/53391 | 10/1999 |
| WO | WO 99/57626 | 11/1999 |
| WO | WO 00/02115 | 1/2000 |
| WO | WO 00/10278 | 2/2000 |
| WO | WO 00/25214 | 5/2000 |
| WO | WO 00/25527 | 5/2000 |
| WO | WO 00/34867 | 6/2000 |
| WO | WO 00/54458 | 9/2000 |
| WO | WO 01/84285 | 11/2001 |
| WO | WO 02/06928 | 1/2002 |
| WO | WO 02/056152 | 7/2002 |
| WO | WO 02/101516 | 12/2002 |

| | | | |
|---|---|---|---|
| 6,460,141 | B1 | 10/2002 | Olden |
| 6,463,426 | B1 | 10/2002 | Lipson et al. |
| 6,467,002 | B1 | 10/2002 | Yang |
| 6,470,449 | B1 | 10/2002 | Blandford |
| 6,477,585 | B1 | 11/2002 | Cohen et al. |
| 6,477,648 | B1 | 11/2002 | Schell et al. |
| 6,477,651 | B1 | 11/2002 | Teal |
| 6,484,203 | B1 | 11/2002 | Porras et al. |
| 6,487,666 | B1 | 11/2002 | Shanklin et al. |
| 6,493,752 | B1 | 12/2002 | Lee et al. |
| 6,496,858 | B1 | 12/2002 | Frailong et al. |
| 6,499,107 | B1 | 12/2002 | Gleichauf et al. |
| 6,510,523 | B1 | 1/2003 | Perlman et al. |
| 6,517,587 | B2 | 2/2003 | Satyavolu et al. |
| 6,519,647 | B1 | 2/2003 | Howard et al. |
| 6,519,703 | B1 | 2/2003 | Joyce |
| 6,530,024 | B1 | 3/2003 | Proctor |
| 6,535,227 | B1 | 3/2003 | Fox et al. |
| 6,546,493 | B1 | 4/2003 | Magdych et al. |
| 6,563,959 | B1 | 5/2003 | Troyanker |
| 6,574,737 | B1 | 6/2003 | Kingsford et al. |
| 6,578,147 | B1 | 6/2003 | Shanklin et al. |
| 6,584,454 | B1 | 6/2003 | Hummel, Jr. et al. |
| 6,601,190 | B1 | 7/2003 | Meyer et al. |
| 6,606,744 | B1 | 8/2003 | Mikurak |
| 6,618,501 | B1 | 9/2003 | Osawa et al. |
| 6,628,824 | B1 | 9/2003 | Belanger |
| 6,647,139 | B1 | 11/2003 | Kunii et al. |
| 6,647,400 | B1 | 11/2003 | Moran |
| 6,661,904 | B1 | 12/2003 | Sasich et al. |
| 6,668,082 | B1 | 12/2003 | Davison et al. |
| 6,668,084 | B1 | 12/2003 | Minami |
| 6,681,331 | B1 | 1/2004 | Munson et al. |
| 6,691,232 | B1 | 2/2004 | Wood et al. |
| 6,694,434 | B1 * | 2/2004 | McGee et al. ............... 713/189 |
| 6,704,874 | B1 | 3/2004 | Porras et al. |

OTHER PUBLICATIONS

Newman, David, Intrusion Detection Systems, Data Communications, 1998, pp. 1-9.

International Search Report for PCT/US02/17161 of Dec. 31, 2002.

Hyland, et al., Concentric Supervision of Security Applications: A New Security Management Paradigm Computer Security Applications Conference, 1998, pp. 59-68.

Koilpillai et al., Recon-A Tool for Incident Detection, Tracking and Response, Darpa Information Survivability Conference and Exposition, 2000, pp. 199-206.

Alves-Foss, J., An Overview of SNIF: A Tool for Surveying Network Information Flow, Network and Distributed System Security, 1995, pp. 94-101.

Mansouri-Samani et al., A Configurable Event Service for Distributed Systems Configurable Distributed Systems, 1996, pp. 210-217.

International Search Report for PCT/US01/13769 of Mar. 8, 2002.

Jagannathan et al., System Design Document: Next-Generation Intrusion Detection Expert Systems (NIDES), Internet Citation, Mar. 9, 1993, XP002136082, pp. 1-66.

Koilpillai, Adaptive Network Security Management, DARPA NGI PI Conference, Oct. 1998, pp. 1-27.

Hiverworld Continuous Adaptive Risk Management, Hiverworld, Inc., 1999-2000, pp. 1-14.

International Search Report for PCT/US02/04989of Sep. 19, 2002.

International Search Report for PCT/US02/02917 of Aug. 8, 2002.

Guha et al., Network Security via Reverse Engineering of TCP Code: Vulnerability Analysis and Proposed Solution, IEEE, Mar. 1996, pp. 603-610.

Garg et al., High Level Communication Primitives for Concurrent Systems, IEEE, 1998, pp. 92-99.

Hastings et al., TCP/IP Spoofing Fundamentals, IEEE, May 1996, pp. 218-224.

Snapp, Signature Analysis and Communication Issues in a Distributed Intrusion Detection System, Master Thesis, University of California, Davis, California, 1991, pp. 1-40.

Guha et al., Network Security via Reverse Engineering of TCP Code: Vulnerability Analysis and Proposed Solutions, IEEE, Jul. 1997, pp. 40-48.

Djahandari et al., An MBone for an Application Gateway Firewall, IEEE, Nov. 1997, pp. 72-81.

Kim et al., Implementing a Secure Login Environment: A Case Study of Using a Secure Network Layer Protocol, Department of Computer Science, University of Alabama, Jun. 1995, pp. 1-9.

Satyanarayanan, Integrating Security in a Large Distributed System, Acm Transaction on Computer Systems, vol. 7, No. 3, Aug. 1989, pp. 47-280.

Winn Schwartau, "e.Security™-Solving 'Dumb Days' With Security Visualization," e-Security, Inc., Naples, FL 34103, 2000.

Anita D'Amico, Ph.D., "Assessment of Open e-Security Platform™: Vendor-Independent Central Management of Computer Security Resources," Applied Visions, Inc., 1999.

"e.Security™-Open Enterprise Security Management: Delivering an integrated, automated, centrally Managed Solution You Can Leverage Today and Tomorrow," e-Security, Inc., Naples, FL 34102, 1999.

"e.Security™-Vision," e-Security, Inc., Naples, FL, 1999.

"e-Security™ -Administrator Workbench™," e.Security, Inc. Naples, FL, 1999.

"e.Security™-Fact Sheet," e-Security, Inc., Naples, FL, 1999.

"e.Security™-Open e-Security Platform™," e-Security, Inc. Naples, FL, 1999.

Babcock, "E-Security Tackles The Enterprise," Jul. 28, 1999; Inter@ctive Week, www.Zdnet.com.

Kay Blough, "In Search of More-Secure Extranets," Nov. 1, 1999, www.InformationWeek.com.

Paul H. Desmond, "Making Sense of Your Security Tools," Software Magazine and Wiesner Publishing, www.softwaremag.com, 1999.

Kay Blough, "Extra Steps Can Protect Extranets," Nov. 1, 1999, www. InformationWeek.com.

Sean Hao, "Software protects e-commerce—e-Security's product alerts networks when hackers attack," Florida Today, Florida.

Scott Weiss, "Security Strategies—E-Security, Inc.," product brief, Hurwitz Group, Inc., Mar. 24, 2000.

Sean Adee, CISA, "Managed Risk, Enhanced Response—The Positive Impact of Real-Time Security Awareness," Information Systems Control Journal, vol. 2, 2000.

"Reprint Review—The Information Security Portal—Open e-Security Platform Version 1.0", Feb. 2000, West Coast Publishing, SC Magazine, 1999.

"e.Security—Introducing the First Integrated, Automated, and Centralized Enterprise Security Management System," white paper, e-Security, Inc., Naples, FL 34102, 1999.

Ann Harrison, "Computerworld—Integrated Security Helps Zap Bugs," Feb. 21, 2000, Computerworld, vol. 34, No. 8, Framingham, MA.

Shruti Daté, "Justice Department Will Centrally Monitor Its Systems For Intrusions," Apr. 3, 2000, Post-Newsweek Business Information, Inc., www.gcn.com.

e.Security™, website pages (pp. 1-83), www.esecurityinc.com, e-Security, Inc., Naples, FL 34103, Sep. 14, 2000.

Peter Sommer, "Intrusion Detection Systems as Evidence," Computer Security Research Centre, United Kingdom.

Musman et al., System or Security Managers Adaptive Response Tool, DARPA Information Survivability Conference and Exposition, Jan. 25, 2000, pp. 56-68.

Gibson Research Corporation Web Pages, Shields Up!—Internet Connection Security Analysis, grc.com/default.htm, Laguna Hills, California, 2000.

Rouse et al., Design and Evaluation of an Onboard Computer-Based Information System fro Aircraft, IEEE Transactions of Systems, Man, and Cybernetics, vol. SMC-12, No. 4, Jul./Aug. 1982, pp. 451-463.

Hammer, An Intelligent Flight-Management Aid for Procedure Execution, IEEE Transactions on Systems, Man, and Cybernetics, vol. SMC-14, No. 6, Nov./Dec. 1984, pp. 885-888.

Mann et al., Analysis of User Procedural Compliance in Controlling a Simulated Process, IEEE Transactions on Systems, Man, and Cybernetics, vol. SMC-16, No. 4, Jul./Aug. 1986.

Todd, Signed and Delivered: An Introduction to Security and Authentication, Find Out How the Jave Security API Can Help you Secure your Code, Javaworld, Web Publishing, Inc., San Francisco, Dec. 1, 1998, pp. 1-5.

Arvind, Secure This. Inform, Association for Information and Image Management, Silver Spring, Sep./Oct. 1999, pp. 1-4.

Stevens, TCP/IP Illustrated, vol. 1, 1994, pp. 247.

Lee et al., A Generic Virus Detection Agent on the Internet, IEEE, $30^{th}$ Annual Hawaii International Conference on System Sciences, 1997, vol. 4.

Cutler, Inside Windows NT, 1993, Microsoft Press.

Duncan, Advanced MS-Dos, 1986, Microsoft Press.

McDaniel, IBM Dictionary of Computing, 1994, International Business Machines Corporation.

Burd, Systems Architecture, 1998, Course Technology, Second Edition.

Programmer's Guide PowerJ, 1997, Sybase.

Swimmer et al., Dynamic detection and classification of computer viruses using general behavior patterns, 1995, Proceedings of the Fifth International Virus Bulletin Conference, Boston.

Advanced Virus Detection Technology for the Next Millennium, Aug. 1999, Network Associated, A Network Associates Executive White Paper, pp. 1-14.

Enterprise-Grade Anti-Virus Automation in the $21^{st}$ Century, Jun. 2000, Symantec, Technology Brief, pp. 1-17.

Kephart et al., Blueprint for a Computer Immune System, 1997, Retrieved from Internet, URL: http://www.research.ibm.com/antivirus/scipapers/kephart/VB97, pp. 1-15.

Richardson, Enterprise Antivirus Software, Feb. 2000, Retrieved from Internet, URL: http://www.networkmagazine.com/article/nmg2000426S0006, pp. 1-6.

Understanding and Managing Polymorphic Viruses, 1996, Symantec, The Symantec Enterprise Papers, vol. XXX, pp. 1-13.

Gong, JavaTM Security Architecture (JDK1.2), Oct. 2, 1998, Sun Microsystems, Inc., Version 1.0, pp. i-iv, 1-62.

Softworks Limited VBVM Whitepaper, Nov. 3, 1998, Retrieved from the Internet, URL: http://web.archive.org/web/19981203105455/http://softworksltd.com/vbvm.html, pp. 1-4.

Kephart, A Biologically Inspired Immune System for Computers, 1994, Artificial Life IV, pp. 130-139.

International Search Report for PCT/US01/26804 of Mar. 21, 2002.

Kosoresow et al., Intrusion Detection via System Call Traces, IEEE Software, pp. 35-42, Sep./Oct. 1997.

Veldman, Heuristic Anti-Virus Technology, Proceedings, $3^{rd}$ International Virus Bulletin Conference, pp. 67-76, Sep. 1993.

Symantec, Understanding Heuristics: Symantec's Bloodhound Technology, Symantec White Paper Series, vol. XXXIV, pp. 1-14, Sep. 1997.

Nachenberg, A New Technique for Detecting Polymorphic Computer Viruses, A thesis submitted in partial satisfaction of the requirements for the degree Master of Science in Computer Science, University of California Los Angeles, pp. 1-127, 1995.

Microsoft P-Code Technology, http://msdn.microsoft.com/archive/default.asp?url=/archive/en-us/dnarvc/html/msdn_c7pcode2.asp, pp. 1-6, Apr. 1992.

DJGPP COFF Spec, http://delorie.com/djgpp/doc/coff/, pp. 1-15, Oct. 1996.
Natvig, Sandbox Technology Inside AV Scanner, Virus Bulletin Conference, Sep. 2001, pp. 475-488.
Norman introduces a new technique for eliminating new computer viruses, found on Norman's website, file://c:/documents%20and%20settings\7489\local%20settings\temporary%20internet%20files\olk, pp. 1-2, published Oct. 25, 2001, printed from website Dec. 27, 2002.
International Search Report for PCT/US01/19142 of Jan. 17, 2003.
Using the CamNet BBS FAQ, http://www.cam.net.uk/manuals/bbsfaq/bbsfaq.htm, Jan. 17, 1997.
Express Storehouse Ordering System, "Accessing ESOS through the Network", http://www-bfs.ucsd.edu/mss/esos/man3.htm, Sep. 3, 1996.
NASIRE, NASIRC Bulletin #94-10, http://cs-www.ncsl.nist.gov/secarlert/nasa/nasa9410.txt, Mar. 29, 1994.
Packages in the net directory, http://linux4u.jinr.ru/usoft/WWW/www_debian.org/FTP/net.html, Mar. 20, 1997.
Sundaram, An Introduction to Intrusion Detection, Copyright 1996, published at www.acm.org/crossroads/xrds2-4/intrus.html, pp. 1-12.
Samfat, IDAMN: An Intrusion Detection Architecture for Mobile Networks, IEEE Journal on Selected Areas in Communications, vol. 15, No. 7, Sep. 1997, pp. 1373-1380.
INFO: Visual Basic Supports P-Code and Native Code Compilation (Q229415), http://support.microsoft.com/support/kb/articles/Q229/4/15.ASP, pp. 1-2, Apr. 28, 1999.
International Search Report for PCT/US99/29117 of May 2, 2000.
Nordin, U of MN OIT Security and Assurance, Feb. 9, 2000.
Internet Security Systems, RealSecure SiteProtector, SAFEsuite Decisions to SiteProtector Migration, Aug. 8, 2003, pp. 1-42.
Internet Security Systems, SAFEsuite Enterprise, SAFEsuite Decisions, 1998.
Internet Security Systems, SAFEsuite Enterprise, Recognizing the Need for Enterprise Security: An Introduction to SAFEsuite Decisions, Aug. 1998, pp. 1-9.
Internet Security Systems, SAFEsuite Decisions 2.6, Frequently Asked Questions, Feb. 21, 2001, pp. 1-10.
Internet Security Systems, SAFEsuite Decisions Version 1.0, User's Guide, 1998, pp. 1-78.
Porras et al., Emerald: Event Monitoring Enabling Responses to Anomalous Live Disturbances, Computer Science Laboratory, SRI International, Menlo Park, CA, Oct. 1997, pp. 353-365.
Cisco Systems, Empowering the Internet Generation, 1998.
Messmer, Start-Up Puts Hackers on BlackICE, Network World Fusion, http://www.nwfusion.com/cgi-bin/mailto/x/cgi, Apr. 21, 1999, pp. 1-2.
NeworkICE Corporation, Can You Explain How Your Product Can Protect a Remote User with a VPN Client?, 1998-1999, pp. 1-2, http://www.webarchive.org/web/20000304071415/advice.networkice.com/advice/support/kb/q000003/default.
Yasin, Start-Up Puts Network Intruders on Ice, http://www.internetweek.com/story/INW19990505S0001, May 5, 1999, pp. 1-2.
Morency, NetworkWorldFusion, http://nwfusion.com/cgi-bin/mailto/x.cgi, Jun. 28, 1999, pp. 1-2.
Rogers, Network ICE Touts Security Wares, Apr. 23, 1999, San Mateo, California, http://www.crn.com/showArticle.jhtml?articleID=18829106&flatPage=true, pp. 1-2.
Rogers, Network ICE Signs Resellers, May 26, 1999, San Mateo, California, http://www.crn.com/showArticle.jhtml?articleID=18805302&flatPage=true, pp. 1-2.
Internet Security Systems, I've Been Attacked! Now What?, Aug. 27, 1999, http://www.iss.net/security_center/advice/Support/KB/q000033/default.htm, pp. 1-2.
Internet Security Systems, What is the Format of "Attack-List.CSV"?, Aug. 21, 1999, http://www.iss.net/security_center/advice/Support/KB/q000018/default.htm, pp. 1-2.
Neumann et al., Experience with Emerald to Date, Apr. 11-12, 1999, 1st USENIX Workshop on Intrusion Detection and Network Monitoring, Santa Clara, California, pp. 1-9.
Lindqvist et al., Detecting Computer and Network Misuse Throught the Production-Based Expert System Toolset (P-BEST), May 9-12, 1999, Proceedings of the 1999 IEEE Symposium on Security and Privacy, Oakland, California, pp. 1-16.
Kendall, A Database of Computer Attacks for the Evaluation of Intrusion Detection Systems, Jun. 1999, Department of Defense Advanced Research Projects Agency, pp. 1-124.
Neumann, Computer Security and the U.S. Infrastructure, Nov. 6, 1997, Congressional Testimony, pp. 1-11.
Porras et al., Life Traffic Analysis of TCP/IP Gateways, Nov. 10, 1997, Internet Society's Networks and Distributed Systems Security System Symposium, Mar. 1998, http://www.sdl.sri.com/projects/emerald/live-traffic.html, pp. 1-16.
Raynaud et al., Integrated Network Management IV, 1995, Proceedings of the 4th International Symposium on Integrated Network Management, pp. 1-2 and 5-16.
Heberlein et al., A Method to Detect Intrusive Activity in a Networked Environment, Oct. 1-4, 1991, 14th National Computer Security Conference, Washington, D.C., pp. 362-363 and 365-371.
Ko et al., Execution Monitoring of Security-Critical Programs in Distributed Systems: A Specification-Based Approach, 1997, Proceedings of the 1997 IEEE Symposium on Security and Privacy, pp. 175-187.
Crosbie et al., Active Defense of a Computer System Using Autonomous Agents, Technical Report No. 95-008, Feb. 15, 1995, Purdue University, West Lafayette, Indiana, pp. 1-14.
Mansouri-Samani et al., Monitoring Distributed Systems, Nov. 1993, IEEE Network, pp. 20-30.
Jakobson et al., Alarm Correlation, Nov. 1993, IEEE Network, pp. 52-59.
Anderson et al., Next-Generation Intrusion Detection Expert (NIDES), A Summary, May 1995, SRI International, pp. 1-37.
Veritas Software, Press Release, Robust Enhancements in Version 6.0 Maintain Seagate WI as the De Facto Standard for Software Distribution, Oct. 6, 1997, Press Releases, pp. 1-4, http://216.239.39.104/search?q=cache:HS9kmK1m2QoJ:www.veritas.com/us/aboutus/pressrom/199....
Yasin, Network-Based IDS are About to Stop Crying Wolf, Security Mandate: Silence False Alarms, Apr, 9, 1999, http://lists.jammed.com/ISN/1999/04/0021.html, pp. 1-3.
Internet Security Systems, Press Release, ISS Reports Revenues and Net Income for Second Quarter, Jul. 19, 1999, http://bvlive01.iss.net/issEn/delivery/prdetail.jsp?type=Financial&oid=14515, pp. 1-5.
LaPadula, State of the Art in CyberSecurity Monitoring, A Supplement, Sep. 2001, Mitre Corporation, pp. 1-15.
Balasubramaniyan et al., An Architecture for Intrusion Detection Using Autonomous Agents, Jun. 11, 1998, Purdue University, West Lafayette, Indiana, pp. 1-4, http://gunther.smeal.psu.edu/images/b9/f3/bb/9e/ba7f39c3871dcedeb9abd0f70cb84607/1.png.
Crosbie et al., Active Defense of a Computer System Using Autonomous Agents, Feb. 15, 1995, Technical Report No. 95-008, Purdue University, West Lafayette, Indiana, pp. 1-14.
Crosbie et al., Defending a Computer System Using Autonomous Agents, Mar. 11, 1994, Technical Report No. 95-022, Purdue University, West Lafayette, Indiana, pp. 1-11.
Denning, An Intrusion-Detection Model, Feb. 1987, IEEE Transactions on Software Engineering, vol. SE-13, No. 2, pp. 1-17.
Lunt, A Survey of Intrusion Detection Techniques, 1993, Computers & Security, 12 (1993), pp. 405-418.
Porras et al., Penetration State Transition Analysis A Rule-Based Intrusion Detection Approach, 1992, pp. 220-229.
Javitz et al., The NIDES Statistical Component: Description and Justification, SRI International, Menlo Park, California, SRI Project 3131, Mar. 7, 1994.
Lindqvist et al., Detecting Computer and Network Misuses Through the Production-Based Expert System Toolset (P-BEST), Oct. 25, 1998, pp. 1-20.
Javitz et al., The SRI IDES Statistical Anomaly Detector, SRI Internationa, Menlo Park, California, May 1991, IEEE Symposium on Security and Privacy, pp. 1-11.
Porras et al., Live Traffic Analysis of TCP/IP Gateways, Nov. 10, 1997, SRI International, Menlo Park, California, pp. 1-16.

Porras et al., Live Traffic Analysis of TCP/IP Gateways, Dec. 12, 1997, SRI International, Menlo Park, California, Proceedings of the 1998 ISOC Symposium on Network and Distributed Systems Security, pp. 1-13.
Information & Computing Sciences: System Design Laboratory: Programs: Intrusion Detection, SRI International, http://www.sdl.sri.com/programs/intrusion/, Jun. 17, 2004, pp. 1-2.
Lindqvist et al., eXpert-BSM: A Host-based Intrusion Detection Solution for Sun Solaris, SRI International, Menlo Park, California, Dec. 10-14, 2001, Proceedings of the 17th Annual Computer Security Applications Conference, pp. 1-12.
Almgren et al., Application-Integrated Data Collection for Security Monitoring, Oct. 10-12, 2001, SRI International, Menlo Park, California, pp. 1-15.
Debar et al., Research Report: A Revised Taxonomy for Intrusion-Detection Systems, Oct. 25, 1999, IBM Research, Switzerland, pp. 1-23.
Porras et al., Emerald: Event Monitoring Enabling Responses to Anomalous Live Disturbances, Computer Science Laboratory, SRI International, Menlo Park, CA, Dec. 18, 1996, pp. 1-3.
Frequently-Asked Questions about RealSecure, pp. 1-14, http://web.archive.org/web/19970721183227/iss.net/prod/rs_faq.html, May 30, 1997.
Cisco Systems, Inc., Empowering the Internet Generation, 1998.
Internet Security Systems, Inc., RealSecure Release 1.2 for UNIX, A User Guide and Reference Manual, 1997.
Internet Security Systems, Inc., Real-time attack recognition and response: A solution for tightening network security, Jan. 1997, pp. 1-13.
Internet Security Systems, Inc., SAFEsuite Decisions User Guide, Version 1.0, 1998, pp. 1-78.
NetworkICE Corporation, ICEcap Administrator's Guide, Version 1.0 BETA, 1999, pp. 1-142.
Debar, Herve et al., A Neural Network Component for an Intrusion Detection System, 1992, pp. 240-250.
SRI International, A Prototype IDES: A Real-Time Intrusion-Detection Expert System, Aug. 1987, pp. 1-63.
SRI International, Requirements and Model for IDES-A Real-Time Intrusion-Detection Expert System, Aug. 1985, pp. 1-70.
SRI International, An Intrusion-Detection Model, Nov. 1985, pp. 1-29.
Dowell et al., The ComputerWatch Data Reduction Tool, Proc. of the 13th National Computer Security Conference, Washington, D.C., Oct. 1990, pp. 99-108.
Fox et al., A Neural Network Approach Towards Intrusion Detection, Jul. 2, 1990, pp. 125-134.
Garvey et al., Model-Based Intrusion Detection, Oct. 1991, pp. 1-14.
Ilgun et al., State Transition Analysis: A Rule-Based Intrusion Detection Approach, Mar. 1995, pp. 181-199.
Javitz et al., The SRI IDES Statistical Anomaly Detector, May 1991, pp. 1-11.
SRI International, The NIDES Statistical Component Description and Justification, Mar. 7, 1994, pp. 1-46.
Karen, Oliver, PC Magazine, The Digital Doorman, Nov. 16, 1999, p. 68.
Liepins et al., Anomaly Dectection: Purpose and Frameowrk, 1989, pp. 495-504.
Lindqvist et al., Detecting Computer and Network Misuse Through the Production-Bases Expert System Toolset (P-BEST), Oct. 25, 1998, pp. 1-20.
Lunt, Teresa, A survey of intrusion detection techniques, 1993, pp. 405-418.
Lunt, Teresa, Automated Audit Trail Analysis and Intrusion Detection: A Survey, Oct. 1988, pp. 1-8.
Porras et al., Penetration State Transition Analysis A Rule-Based Intrusion Detection Approach, 1992, pp. 220-229.
Sebring et al., Expert Systems in Intrusion Detection: A Case Study, Oct. 1988, pp. 74-81.
Shieh et al., A Pattern-Oriented Intrusion-Detection Model and Its Applications, 1991, pp. 327-342.
Smaha, Stephen, Haystack: An Intrusion Detection Systems, 1988.
Snapp, Steven Ray, Signature Analysis and Communications Issues in a Distributed Intrusion Detection System, 1991, pp. 1-40.
Porras et al., Emerald: Event Monitoring Enabling Responses to Anomalous Live Disturbances, Oct. 1997, pp. 353-365.
Lunt et al., Knowledge-Based Intrusion Detection, Mar. 1989, pp. 102-107.
Lunt et al., An Expert System to Classify and Sanitize Text, Dec. 1987, pp. 1-5.
Tener, William, Computer Security in the Age of Information, AI & 4GL: Automated Detection and Investigation Tools, 1989, pp. 23-29.
Teng et al., Adaptive Real-time Anomaly Detection Using Inductively Generated Sequential Patterns, 1990, pp. 278-284.
Vaccaro et al., Detection of Anomalous Computer Session Activity, 1989, pp. 280-289.
Winkler, J.R., A UNIX Prototype for Intrusion and Anomaly Detection in Secure Networks, 1990, pp. 115-124.
Boyen et al. Tractable Inference for Complex Stochastic Process, Jul. 24-26, 1998.
Copeland, Observing Network Traffic—Techniques to Sort Out the Good, the Bad, and the Ugly, 2000, pp. 1-7.
Goan, Terrance, Communications of the ACM, A Cop on the Beat Collecting and Appraising Intrusion Evidence, Jul. 1999, pp. 47-52.
Heberlein et al., A network Security Monitor, 1990, pp. 296-304.
Jackson et al., An Expert System Applications for the Network Intrusion Detection, Oct. 1991, pp. 1-8.
Lankewicz et al., Real-Time Anomaly Detection Using a Nonparametric Pattern Recognition Approach, 1991, pp. 80-89.
Lippmann et al., Evaluating Intrusion Detection Systems: The 1998 DARPA Off-line Intrusion Detection Evaluation, 1999.
Munson et al., Watcher: The Missing Peice of the Security Puzzle, Dec. 2001.
Pearl, Judea, Probabilistic Reasoning in Intelligent Systems: Networks of Plausible Inference, Sep. 1988.
Porras et al., Live Traffic Analysis of TCP/IP Gateways, Dec. 12, 1997, pp. 1-13.
Emerald TCP Statitical Analyzer 1998 Evaluation Results, http://www.sdl.sri.com/projects/emerald/98-eval-estat/index.html, Jul. 9, 1999, pp. 1-15.
Staniford-Chen, GrIDS-A Graph Based Intrusion Detection System for Large Networks, Oct. 1996.
Tener, William, Discovery; An Expert System in the Commercial Data Security Environment, Dec. 1986, pp. 45-53.
Valdes et al., Adaptive, Model-Based Monitoring for Cyber Attack Detection, 2000, pp. 1-19.
SRI International, Blue Sensors, Sensor Correlation, and Alert Fusion, Oct. 4, 2000.
Valdes et al., Statistical Methods for Computer Usage Anomaly Detection Using NIDES, Jan. 27, 1995, pp. 306-311.
Wimer, Scott, The Core of CylantSecure, http://www.cylant.com/products/core.html, 1999, pp. 1-4.
Zhang et al., A Hierarchical Anomaly Network Intrusion Detection System using Neural Network Classification, Feb. 2001.
Cisco Secure Intrusion Detection System 2.1.1 Release Notes, http://www.cisco.com/univercd/cc/td/doc/product/iaabu/csids/csids3/nr211new.htm, Jun. 10, 2003, pp. 1-29.
Linux Weekly News, http://lwn.net/1998/0910shadow.html, Sep. 8, 1998, pp. 1-38.
Cracker Tracking: Tighter Security with Intrucsion Detection, http://www.bvte.com/art/9805/sec20/art1.htm, May 1998, pp. 1-8.
Cisco Systems, Inc., Newtork RS: Intrusion Detection and Scanning with Active Audit Session 1305, 1998.
Business Security Advisor Magazine, Intrusion Detection Systems: What You Need to Know, http://advisor.com/doc/0527, Sep. 1998, pp. 1-7.
Garvey et al., An Inference Technique for Integrating Knowlege from Disparate Sources, Multisensor Integration Fusion for Intelligenct Machines and Systems, 1995, pp. 458-464.
Power et al., CSI Intrusion Detection System Resource, Jul. 1998, pp. 1-7.
Cisco Systems, Inc., NetRanger User's Guide Version 2.1.1, 1998.
Internet Security Systems, Real-Time Attack Recognition and Response: A Solution for Tightening Network Security, http://www.iss.net, 1997, pp. 1-13.

Network ICE Corporation, Network ICE Product Documentation, pp. 1-3, http://www.web.archive.org/web/20011005080013/www.networkice.com/support/documentation.html, Jul. 6, 2004.

Network ICE Corporation, Network ICE Documentation, p. 1, http://www.web.archive.org/web/19991109050852/www.networkice.com/support/docs.htm, Jul. 6, 2004.

Network ICE Corporation, Network ICE Press Releases, p. 1, http://www.web/archive.org/web/19990903214428/www.netice.com/company/pressrelease/press.htm, Jul. 7, 2004.

Network ICE Corporation, Network ICE Press Releases, p. 1, http://www.web.archive.org/web/20000304074934/www.netice.com/company/pressrelease/press.htm, Jul. 7, 2004.

Brentano et al., An Architecture for Distributed Intrusion Detection Systems, Department of Energy Computer Security Group, 14th Annual Conference Proceedings, pp. (17)25-17(45), May 1991.

Staniford-Chen et al., GrIDS-A Graph Based Intrusion Detection System for Large Networks, University of California, Davis, California, 19th National Information Systems Security Conference, 1996, pp. 1-10.

Ricciulli et al., Modeling Correlated Alarms in Network Management Systems SRI International, Menlo Park, California, , Proceedings of the Conference on Communication Networks and Distributed System Modeling and Simulation, 1997, pp. 1-8.

Porras et al., Emerald: Event Monitoring Enabling Responses to Anomalous Live Distrurbances, SRI International, Menlo Park, California, 20[the] National Information Systems Security Conference, Oct. 1997, pp. 1-24.

Porras et al., A Mission-Impact Based Approach to INFOSEC Alarm Correlation, SRI International, Menlo Park, California, Oct. 2002, pp. 1-33.

Phrack 55 Download (234 kb, Sep. 9, 1999), http://www.phrack.org/show.php?p=55&a=9, pp. 1-6.

Porras et al., A Mission-Impact-Based Approach to INFOSEC Alarm Correlation, SRI International, Menlo Park, California, Oct. 2002, pp. 1-19.

Bace, An Introduction to Intrusion Detection and Assessment for System and Network Security Management, 1999, pp. 1-38.

Hunteman, Automated Information System—(AIS) Alarm System, University of California, Los Alamos National Laboratory, 20th National Information System Security Conference, Oct. 1997, pp. 1-12.

Janakiraman et al., Indra: A Peer-to-Peer Approach to Network Intrusion Detection and Prevention, Proceedings of the 12th International Workshop on Enabling Technologies: Infrastructure for Collaborative Enterprises, 2003, pp. 1-5.

Innella, Intrusion Detection Systems (IDS), Navy Information Assurance, Jun. 28, 2004, pp. 1-4, http://www.infosec.navy.mil/ps/?t=infosecprodsservices/inforsecprodsservices.tag&bc=/infosecprodsservices/b . . . .

Curry, Intrusion Detection Systems, IBM Emergency Response Service, Coast Laboratory, http://www.cerias.purdue.edu/about/history/coast_resources/idcontent/ids.html, Jul. 19, 2004, pp. 1-28.

Lunt et al., Knowledge-Based Intrusion Detection, SRI International, Menlo Park, California, Conference on AI Systems in Government, Washington, D.C., Mar. 1989, pp. 102-107.

A. Information Assurance BAA 98-34 Cover Sheet, SRI International, Nov. 1, 2000, pp. 2-35.

NetScreen Products, FAQ, http://www.netscreen.com/products/faq.html, Feb. 28, 2003, pp. 1-6.

Miller, A Network Under Attack: Leverage Your Existing Instrumentation to Recognize and Respond to Hacker Attacks, NetScout Systems, Westford, MA, Apr. 2003, pp. 1-8.

Technology Brief: Intrusion Detection for the Millennium, Internet Security Systems, 2000, pp. 1-6.

Weiss et al., Analysis of Audit and Protocol Data using Methods from Artificial Intelligence, Siemens AG, Munich, Germany, Proc. of the 13th National Computer Security Conference, Washington, D.C., Oct. 1990, pp. 109-114.

Snapp et al., DIDS (Distributed Intrusion Detection System)—Motivation, Architecture, and an Early Protype), University of California, Davis California, , Proc. 14th National Computer Security Conference, Washington, D.C., Oct. 1991, pp. 167-176.

Internet Security Systems, Inc., SAFEsuite Enterprise Edition, Project "Gatekeeper" 1.0, Market Requirements Document, Mar. 30, 1998, pp. 1-12.

Internet Security Systems, SAFEsuite Decisions, 2000, pp. 1-2.

Internet Security Systems, Dynamic Threat Protection, Presse-Roundtable, Munich, Germany, Apr. 10, 2003, pp. 1-63.

Internet Security Systems, Preliminary ODM 1.0 Functional Specification, Aug. 1997, pp. 1-7.

Internet Security Systems, Inc., Scanner-ISSDK Interface, Design Specification, Jun. 2, 2000, Draft 1.07, pp. 1-7.

RealSecure, Adaptive Network Security Manager Module Programmer's Reference Manual, pp. 1-74.

Advanced Concept Technology Demonstrations (ACTD), 2005, pp. 1-28.

Frank, Sounding the Alarm, Sep. 6, 1999, Federal Computer Week, pp. 1-2.

Crumb, Intrusion Detection Systems to be Integrated at AFRL, Air Force Research Laboratory, News@AFRL, Fall 1999, p. 1.

Temin, Case Study: The IA: AIDE System at Two, 15th Annual Computer Security Applications Conference, Dec. 6-10, 1999, Phoenix, Arizona, pp. 1-26.

Spink, Automated Intrusion Detection Environment (AIDE), Intrusion Detection Sensor Fusion, Sep. 7, 1999, pp. 1-25.

Frincke et al., A Framework for Cooperative Intrusion Detection, 21st National Information Systems Security Conference, Oct. 6-9, 1998, Crystal City, Virginia, pp. 1-20.

Anderson et al., In Athena's Camp: Preparing for Conflict in the Information Age, An Exploration of Cyberspace Security R&D Investment Strategies for DARPA: The Day After-in Cyberspace II, Chaper Eleven, 1996, pp. 253-271.

Valdes et al., SRI International, Probabilistic Alert Correlation, 2001, pp. 1-15.

Bass, Multisensor Data Fusion for Next Generation Distributed Intrusion Detection Systems, Apr. 28, 1999, Iris National Symposium, pp. 1-6.

Perrochon et al., Enlisting Event Patterns for Cyber Battlefield Awareness, No Date, Stanford University, pp. 1-12.

Perrochon, Using Context-Based Correlation in Network Operations and Management, Jul. 2, 1999, Stanford University, pp. 1-20.

Perrochon, Real Time Event Based Analysis of Complex Systems, Jun. 1998, pp. 1-9.

Luckham et al., Complex Event Processing in Distributed Systems, Aug. 18, 1988, Stanford University, pp. 1-26.

Pettigrew, US Southcom United States Southern Command's Information Sharing Projects, Summer 1999, IAnewsletter, vol. 3, No. 1, pp. 1-24.

Levitt et al., CMAD IV, Computer Misuse & Anomaly Detection, Session Summaries, Nov. 12-14, 1996, Proceedings of the Fourth Workshop on Future Directions in Computer Misuse and Anomaly Detection, Monterey, California, pp. 1-86.

Cheung et al., The Design of GrIDS: A Graph-Based Intrusion Detection System, Jan. 26, 1999, University of California, pp. 1-51.

Cohen et al., Report of the Reporting and Analysis Track, Detection of Malicious Code, Intrusions, and Anomalous Activities Workshop, Feb. 22-23, 1999, pp. 1-47.

Garofalakis et al., Network Mining and Analysis: The Nemesis Project, Bell Labs, Lucent Technologies, No. Date, pp. 1-12.

RealSecure ICEcap Manager User Guide Verison 3.6, Internet Security Systems, Inc., 1998-2002, pp. 1-228.

Cuppens, Cooperative Intrusion Detection, Date Unknown, pp. 1-10.

Mukherjee et al., Network Intrusion Detection, IEEE Network, May/Jun. 1994, pp. 26-41.

Machlis, Net Monitoring Tools Gain Real-Time Alerts, Apr. 14, 1997, http://www.computerworld.com, pp. 1-12.

OmniGuard/ITA Intruder Alert, AXENT Technologies, Inc., Nov. 17, 2004, http://www.web.archive.org, pp. 1-10.

NetRanger Overview, Chapter 1, Date Unknown, pp. 1-16.

Sutterfield, Large-Scale Network Intrusion Detection, 1997, WheelGroup Corporation, pp. 1-10.

Kumar et al., An Application of Pattern Matching in Intrusion Detection, Technical Report No. CSD-TR-94-013, Jun. 17, 1994, Purdue University, pp. 1-55.

Huang et al., A Large-Scale Distributed Intrusion Detection Framework Based on Attack Strategy Analysis, Date Unknown, The Boeing Company, pp. 1-12.
Perrochon et al., Event Mining with Event Processing Networks, Date Unknown, Stanford University, pp. 1-4.
Gruschke, Integrated Event Mangement: Event Correlation Using Dependency Graphs, presented at DSOM 1998, Univeristy of Munich, pp. 1-12.
Bass, Intrusion Detection System and Multisensor Data Fusion, Apr. 2000, Communications of the ACM, vol. 43, No. 4, pp. 99-105.
Bass et al., A Glimpse into the Future of ID, Date Unknown, Usenix, pp. 1-10.
LaPadula, State of the Art in Anomaly Detection and Reaction, Jul. 1999, Mitre Corporation, pp. 1-36.
Rationalizing Security Events with Three Dimensions of Correlation, Date Unknown, NetForensics, Tech Brief, pp. 1-6.
Jou et al., Design and Implementation of a Scalable Intrusion Detection System for the Protection of Network Infrastructure, Date Unknown, MCNC, pp. 1-15.
Caldwell, Event Correlation: Security's Holy Grail?, Aug. 1, 2002, GuardedNet, pp. 1-21.
Metcalf et al., Intrusion Detection System Requirements, Sep. 2000, Mitre Corporation, pp. 1-33.
Jou et al., Architecture Design of a Scalable Intrusion Detection System for the Emerging Network Infrastructures, Technical Report CDRL A005, Apr. 1997, MCNC, pp. 1-42.
Security Manager for UNIX Systems Version 3.2.1 User's Guide, Feb. 1998, Internet Security Systems, pp. 1-162.
RealSecure Release 1.2 for UNIX A User Guide and Reference, Manual, 1997, Internet Security Systems, Inc., pp. 1-92.
Internet Scanner Safe SAFEsuite 4.0 User Guide and Reference Manual, 1996, Internet Security Systems, Inc., pp. 1-158.
Internet Scanner 3.3 User Guide and Reference Manual, 1996, Internet Security Systems, Inc., pp. 1-119.
Landwehr et al., Newsletter of the IEEE Computer Society's TC on Security and Privacy Electronics, Electronic Cipher, Nov. 25, 1997, Issue 25, pp. 1-34.
20th National Information Systems Security Conference, Oct. 6-10, 1997, Baltimore, Maryland, pp. 1-44.
Emerald Alert Management Interface User's Guide Version 1.2, Dec. 6, 2000, SRI International, pp. 1-11.
Anderson et al., Detecting Unusual Program Behavior Using the Statistical Component of the Next-Generation Intrusion Detection Expert System (NIDES), May 1995, SRI International, pp. 1-89.
Lunt et al., Detecting Intruders in Computer Systems, 1993 Conference on Auditing and Computer Technology, SRI International, pp. 1-17.
Network ICE Products—ICEcap, Date Unknown, pp. 1-2.
Forlanda, The Secrets to Driving on BlackICE, Jan. 12, 2000, Network ICE, pp. 1-35.
BlackICE User's Guide Version 1.0 Beta Draft, 1999, Network ICE Corporation, pp. 1-59.
ICEcap Administrator's Guide Version 1.0 Beta Draft, 1999, Network ICE Corporation, pp. 1-25.
Shulak et al., ICEcap Advanced Administration Guide Version 3.0, 2001, Internet Security Systems Corporation, pp. 1-51.
"Real Secure, OS Sensor User Guide," Version 5.0, © Internet Security Systems, Inc. 199?-2000; Sep. 2000, pp. 1-64.
"Real Secure, User's Guide," Version 3.0, © 1992-1998, Internet Security Systems, Inc., pp. 1-128.
"System Security Scanner, User Guide," Version 1.6, © 1996-1998, Internet Security Systems, Inc., pp. 1-164.
"Real Secure™, Network Engine User Guide," Version 3.2.1, © 1999 by Internet Security Systems, Inc., pp. 1-38.
"Real Secure™, User Guide," Version 3.2.1, © 1999 by Internet Security Systems, Inc., pp. 1-38.
"Real Secure™, Manager for HP OpenView User Guide," Version 1.3, © 1999 by Internet Security Systems, Inc., pp. 1-48.
"Database Scanner, User Guide," Version 2.0, © 1992-1999, Internet Security Systems, Inc., pp. 1-112.
"Database Scanner™, User Guide," Version 4.0, © 2000 by Internet Security Systems, Inc., pp. 1-122.
"Database Scanner™, User Guide," Version 3.0.1, , © 1999 by Internet Security Systems, Inc., pp. 1-164.
"Real Secure™, Network Sensor User Guide," Version 5.0, © by Internet Security Systems, Inc., pp. 1-42.
"Real Secure, Server Sensor User Guide," Version 5.5, © Internet Security Systems, Inc. 2000, pp. 1-56.
"Internet Scanner™, User Guide," Version 6.0, Copyright © 1999 by Internet Security Systems, Inc., pp. 1-182.
"Internet Scanner™, User Guide," Version 6.1, © by Internet Security Systems, Inc., pp. 1-226.
"Internet Scanner™, User Guide," Version 5.6, © 1992-1998, Internet Security Systems, Inc., pp. 1-162.
"Internet Scanner™, User Guide," Version 5.3, © 1992-1998, Internet Security Systems, Inc. pp. 1-173.
"Real Secure, Console User Guide," Version 5.5, © 199?-2000, Internet Security Systems, Inc., pp. 1-162.
"Internet Scanner™, User Guide," Version 5.8, © 1999 by Internet Security Systems, Inc., pp. 1-148.
"SAFEsuite Decisions, User Guide," Version 1.0, © 1992-1998, Internet Security Systems, Inc., pp. 1-88.
"Real Secure™, Console User Guide," Version 5.0, © 2000 by Internet Security Systems, Inc., pp. 1-114.
"SAFEsuite Decisions, User Guide," Version 2.5, © 2000 by Internet Security Systems, Inc., pp. 1-194.
"System Scanner, User Guide," Version 1.7, © 1992-1998, Internet Security Systems, Inc., pp. 1-248.
"System Scanner, User Guide," Version 1.0, © 1996-1998, Internet Security Systems, Inc., pp. 1-140.
"System Scanner™, User Guide," Version 4.0, © 1999 by Internet Security Systems, Inc., pp. 1-178.
Internet Security Systems, Inc., "Introduction to RealSecure Version 5.0, The Industry's Only Integrated Host-Based and Network-Based Intrusion Detection System", Aug. 22, 2000, pp. 1-47.
Internet Security Systems, Inc., "RealSecure Network Sensor and Gigabit Network Sensor Policy Guide Version 7.0", Aug. 2003, pp. 1-86.
Internet Security Systems, Inc., "RealSecure Console User Guide Version 3.1", Jun. 1999, pp. 1-98.
Internet Security Systems, Inc., "RealSecure Version 2.0", Apr. 1998, pp. 1-154.
Internet Security Systems, Inc., "Enhanced Dynamic Threat Protection via Automated Correlation and Analysis", an ISS White Paper, 2002, pp. 1-14.
Internet Security Systems, Inc., "RealSecure Site Protector Comparison Guide for Internet Scanner 7.0 Reporting Version 1.2", Mar. 2003, an ISS Tech Note, pp. 1-15.
Internet Security Systems, Inc., "RealSecure Site Protector Comparison Guide for ICEcap Manager Version 1.5", Jan. 2002, an ISS Technical White Paper, pp. 1-27.
Internet Security Systems, Inc., "RealSecure SiteProtector Security Fusion Module 2.0 Frequently Asked Questions", Mar. 2003, pp. 1-8.
Internet Security Systems, Inc., "RealSecure SiteProtector Console User Reference Guide Version 2.0 Service Pack 1", Mar. 14, 2003, Chapter 3, pp. 1-27.
Internet Security Systems, Inc., "Proventia Gateway and Network Protection", Jul. 2003, pp. 1-12.
Farley, Internet Security Systems, Inc., "ID Fusion Technology, A First-Generation Approach", Apr. 29, 1999, National Security Framework Forum, pp. 1-8.
Farley, "RealSecure Fusion Engine Concepts", an ISS White Paper, Jun. 30, 1999, pp. 1-23.
McGraw et al., "Secure Computing with Java: Now and the Future", 1997, http://java.sun.com/security/javaone97-whitepaper.html, pp. 1-20.
NXi Communications, Inc.; White Paper "NTS Security Issues;" Oct. 15, 2001; pp. 1-12.
International Search Report, PCT/US03/00155, May 15, 2003.
Sammons, Nathaniel, "Multi-platform Interrogation and Reporting with Rscan," The Ninth Systems Administration Conference, LISA 1995, Monterrey, California, Sep. 17-22, 1995, pp. 75-87.
Dean et al., "Java Security: From HotJava to Netscape and Beyond," Proceedings of the 1996 IEEE Symposium on Security and Privacy, May 6-8, 1996, Oakland, California, pp. 190-200.

Fisch et al., "The Design of an Audit Trail Analysis Tool," Proceedings of the 10$^{th}$ Annual Computer Security Applications Conference, Dec. 5-9, 1994, Orlando, Florida, pp. 126-132.

Safford et al., "The TAMU Security Package: An Ongoing Response to Internet Intruders in an Academic Environment," USENIX Symposium Proceedings, UNIX Security IV, Oct. 4-6, 1993, Santa Clara, California, pp. 91-118.

Sugawara, Toshiharu, "A Cooperative LAN Diagnostic and Observation Expert System," Ninth Annual Phoenix Conference on Computers and Communications, 1990 Conference Proceedings, Mar. 21-23, 1990, Scottsdale, Arizona, pp. 667-674.

Casella, Karen A., "Security Administration in an Open Networking Environment," The Ninth Systems Administration Conference, LISA 1995, Monterrey, California, Sep. 17-22, 1995, pp. 67-73.

Burchell, Jonathan, "Vi-SPY: Universal NIM?" Virus Bulletin, Jan. 1995, pp. 20-22.

Benzel et al., "Identification of Subjects and Ojects in a Trusted Extensible Client Server Architecture," 18$^{th}$ National Information Systems Security Conference, Oct. 10-13, 1995, Baltimore, Maryland, pp. 83-99.

Epstein et al., "Component Architectures for Trusted Netware," 18$^{th}$ National Information Systems Security Conference, Oct. 10-13, 1995, Baltimore, Maryland, pp. 455-463.

Varadharajan, Vijay, "Design and Management of a Secure Networked Administration System: A Practical Approach," 19$^{th}$ National Information Systems Security Conference, Oct. 22-25, 1996, Baltimore, Maryland, pp. 570-580.

Snapp et al., "DIDS (Distributed Intrusion Detection System)—Motivation, Architecture, and An Early Prototype," 14$^{th}$ National Computer Security Conference, Oct. 1-4, 1991, Washington, DC, pp. 167-176.

Broner et al., "IntelligentI/O Rule-Based Input/Output Processing for Operating Systems," Operating Systems Review, vol. 25, No. 3, Jul. 1991, pp. 10-26.

Drews et al., "Special Delivery—Automatic Software Distribution Can Make You A Hero," Network Computing, Aug. 1, 1994, pp. 80, 82-86, 89, 91-95.

Morrissey, Peter, "Walls," Network Computing, Feb. 15, 1996, pp. 55-59, 65-67.

Harlander, Dr. Magnus, "Central System Administration in a Heterogenous Unix Environment: GeNUAdmin," Proceedings of the Eighth Systems Administration Conference (LISA VIII), Sep. 19-23, 1994, San Diego, California, pp. 1-8.

Shaddock et al., "How to Upgrade 1500 Workstations on Saturday, and Still Have Time to Mow the Yard on Sunday," The Ninth Systems Administration Conference LISA '95, Sep. 17-22, 1995, Monterrey, California, pp. 59-65.

Anderson, Paul, "Towards a High-Level Machine Configuration System," Proceedings of the Eighth Systems Administration Conference (LISA VIII), Sep. 19-23, 1994, San Diego, California, pp. 19-26.

Cooper, Michael A., "Overhauling Rdist for the '90s," Proceedings of the Sixth Systems Administration Conference (LISA VI), Oct. 19-13, 1992, Long Beach, California, pp. 175-188.

Vangala et al., "Software Distribution and Management in a Networked Environment," Proceedings of the Sixth Systems Administration Conference, Oct. 19-23, Long Beach, California, pp. 163-170.

Kim et al., "The Design and Implementation of Tripwire: A File System Integrity Checker," 2$^{nd}$ ACM Conference on Computer and Communications Security, Nov. 2-4, 1994, Fairfax, Virginia, pp. 18-29.

Mounji et al., "Distributed Audit Trail Analysis," Proceedings of the Symposium on Network and Distributed System Security, San Diego, California, Feb. 16-17, 1995, pp. 102-112.

Wobber et al., "Authentication in the Taos Operating Systems," ACM Transactions on Computer Systems, vol. 12, No. 1, Feb. 1994, pp. 3-32.

Mayer et al., "The Design of the Trusted Workstation: A True 'Infosec' Product," 13$^{th}$ National Computer Security Conference, Washington, DC, Oct. 1-4, 1990, pp. 827-839.

Dawson, J. Bruce, "Intrusion Protection for Networks," Byte, Apr. 1995, pp. 171-172.

Buhkan, Michael, "CheckPoint Charlie," PC Week Netweek, Nov. 27, 1995, pp. N1, N6-N7.

Process Software Technical Support page, found on http://www.process.com/techsupport/whitesec.html, printed off of the Process Software website on Feb. 26, 2003, pp. 1-5.

Ganesan, R., "BAfirewall: a modern firewall design," Proceedings Internet Society Symposium on Network and Distributed System Security 1994, Internet Soc. 1994, pp. 99-108, Reston, VA.

Lee, Theodore M.P., "Trusted Systems," Chapter II-1-6 of *Handbook of Information Security Management*, Ed. Zella G. Ruthberg and Harold F. Tipton, Auerbach, Boston and New York, 1993, pp. 345-362.

Lunt, Teresa F., "Automated Intrusion Detection," Chapter II-4-4 of *Handbook of Information Security Management*, Ed. Zella G. Ruthberg and Harold F. Tipton, Auerbach, Boston and New York, 1993, pp. 551-563.

Djahandari et al., "An MBone Proxy for an Application Gateway Firewall", DARPA Contract No. DABT-63-92-C-020, Proceedings of the IEEE Symposium on Security and Privacy, May 1997, pp. 72-81, IEEE (Pertinent pp. 75, ¶ 3-4.1).

Sammons, "Multi-Platform Interrogation and Reporting with Rscan", Proceedings of USENIX Conference on Systems Administration 1995 LISA IX, Sep. 1995, pp. 75-87 (Pertinent pp. 75-77).

Dean et al., "Java Security: From HotJava to Netscape and Beyond", Proceedings of the IEEE Symposium on Security and Privacy, May 1996, pp. 190-200, IEEE (Pertinent pp. 192, ¶ 2.1).

Benzel et al., "Identification of Subjects and Objects in a Trusted Extensible Client Server Architecture", Proceedings of the 18$^{th}$ National Information Systems Security Conference, 1995, pp. 83-99 (Pertinent pp. 83, abstract).

Vangala et al., "Software Distribution and Management in a Networked Environment", Proceedings of USENIX Conference on Systems Administration 1992 LISA Vt, Oct. 1992, pp. 163-170 (Pertinent pp. 169-170).

Kim et al., "The Design and Implementation of Tripwire: A File System Integrity Checker", Proceedings of the 2$^{nd}$ ACM Conference on Computer and Communications Security, 1994, pp. 18-29, ACM (Pertinent pp. 18, abstract).

Lee et al., "A Generic Virus Detection Agent on the Internet", Proceedings of the 30$^{th}$ Hawaii International Conference on System Sciences, Jan. 1997, vol. 4, pp. 210-219, IEEE (Pertinent pp. 210, abstract).

"Enterprise-Grade Anti-Virus Automation in the 21$^{st}$ Century", Technology Brief, 2000, pp. 1-17, Symantec Corporation (Pertinent pp. 3).

Kephart, "A Biologically Inspired Immune System for Computers", Artificial Life IV, Proceedings of the 4$^{th}$ International Workshop on Synthesis and Simulation of Living Systems, 1994, pp. 130-139 (Pertinent pp. 138, ¶ 3.5).

* cited by examiner

SYSTEM AND METHOD FOR THE MANAGED SECURITY CONTROL OF PROCESSES ON A COMPUTER SYSTEM

PRIORITY AND RELATED APPLICATIONS

The present application is a continuation of and claims priority to pending U.S. patent application Ser. No. 10/336,299, filed Jan. 3, 2003, which claims priority to and incorporates herein provisional patent application entitled, "System and Method for the Managed Security Control of Processes on a Computer System," filed on Jan. 4, 2002 and assigned U.S. application Ser. No. 60/345,432.

TECHNICAL FIELD

The present invention is generally directed to managing the security of a network. More specifically, the present invention provides kernel-level protection of a computer system from rogue or malicious computer programs.

BACKGROUND OF THE INVENTION

The security of computing networks is an increasingly important issue. With the growth of wide area networks (WANs), such as the Internet and the World Wide Web, people rely on computing networks to locate, transfer, and store an increasing amount of valuable information. This is also true of local area networks (LANs) used by companies, schools, organizations, and other enterprises. LANs generally are used by a bounded group of people in an organization to communicate and store electronic documents and information. LANs typically are coupled to or provide access to other local or wide area networks. Greater use and availability of computing networks produces a corresponding increase in the size and complexity of computing networks.

With the growth of networks and the importance of information available on the networks, there is also a need for better and more intelligent security. One approach to securing larger and more complex computer networks is to use a greater number and variety of security assessment and intrusion detection devices. Security assessment devices can be used to evaluate elements in the network such as desktop computers, servers, and routers, and determine their respective vulnerability to attack from hackers. Intrusion detection devices, on the other hand, identify and prevent entry of foreign or malicious computer programs and can notify a network manager of the presence or attempted entry of such a computer program. Security assessment and intrusion detection devices can also be used more frequently to monitor the activity or status of the elements in a computing network.

However, simply adding devices or filters to a network is not always the only and best solution to maintaining network security. Adding security devices can complicate the network and inundate the network manager with security data. Threats to the security of a device or network can take a variety of forms including the introduction of harmful computer code, unauthorized attempts to gain access, and misuse by people with authority to use a device or network. The various types of harmful computer code that can threaten a computing device or distributed computing system can generally be categorized as either a virus or some form of "malware". Computer viruses harm computing devices and systems by entering and then propagating. In some respects, the propagating nature of computer viruses makes them easier to detect and there are many commercially available products that detect and exclude viruses from computing devices and systems.

In contrast, malware is a general description for other types of programs and computer code that are designed to harm a computing device or system in ways other than simply propagating as a virus does. Malware presents a more sophisticated challenge for network security and traditional anti-virus software is not designed to prevent malware from harming computing devices and networks. Malware can take a variety of forms including corrupted applications and applications that retrieve corrupted code that is modified to harm a computing device or network.

There are generally two different approaches to protecting against malware. The first approach involves virtual execution of a computer code to attempt to identify harmful code before it is allowed to actually execute. Virtual execution is limited in its ability to detect harmful code because it does not actually execute every process of the code. Instead, the virtual execution technique performs a quick and high-level "walk through" of the processes in the code to attempt to detect suspicious patterns in the code. By its nature, the virtual execution technique is limited in its ability to detect suspicious activities embedded in a piece of code. As a result, when the virtual execution technique is implemented, it must be used conservatively which produces a high number of false positive alerts. In other words, because the virtual execution security technique is not as accurate as actually running the code, it is implemented to identify a broader scope of potentially suspicious code and produces a greater number of alerts to the user. A high percentage of false positive security alerts is undesirable because it translates into a greater number of security interruptions for the user.

The second approach involves controlling and monitoring a computing device in real time while it is actually running a program and attempting to anticipate any harmful activity the program may try to initiate. One example of a real-time solution is set forth in U.S. Pat. No. 5,987,611, which describes a client-based monitoring system for filtering network access in conjunction with a centralized enforcement supervisor. The supervisor maintains access rules for the client-based filtering and verifies the existence and proper operation of the client-based filter application. Access rules specify network access criteria for a client, such as (1) total time a user can be connected to the Internet (e.g., per day, week, month, or the like), (2) time a user can interactively use the Internet (e.g., per day, week, month, or the like), (3) a list of applications or application versions that a user can or cannot use in order to access the Internet, (4) a list of URLs (or WAN addresses) that a user application can (or cannot) access, (5) a list of protocols or protocol components that a user application can or cannot use, and (6) rules to determine what events should be logged (including how long are logs to be kept).

By intercepting process loading and unloading and keeping a list of currently-active processes, each client process can be checked for various characteristics, including checking executable names, version numbers, executable file checksums, version header details, configuration settings, and the like. With this information, a determination can be made whether a particular process in question should have access to the Internet and what kind of access (i.e., protocols, Internet addresses, time limitations, and the like) is permissible for the given specific user.

The limitation with the solution presented in U.S. Pat. No. 5,987,611 and other similar real-time prior art solutions is that they are packet based. In other words, the security decisions are based on the data packets that are passing between the computing device that is being monitored and external networks or computing resources. When security decisions are based on the traffic of data packets, it is more likely the security systems will not detect harmful activities until after the harm has already begun. Accordingly, the second approach is not satisfactory because conventional real-time security monitoring solutions do not detect security problems early enough and allow time for a response before the malicious program does harm.

In view of the foregoing, there is a need in the art for a security system which will provide early detection of security threats to a computing device or network before any harm can be done. Specifically, a need exists to be able to quickly and efficiently examine code in real time, but before it is able to harm a computing device or system. A further need exists for a computer security system that can accurately identify security threats contained in software programs so that users are not interrupted frequently to address potential security questions. Finally, a security system is needed that can efficiently and effectively respond to security threats detected in software programs.

SUMMARY OF THE INVENTION

The present invention satisfies the above-described needs by evaluating and monitoring software programs running on a computing device. The invention uses a protector system that comprises several different software modules for performing evaluation, detection, monitoring, and response functions. Implementing a two-phased approach at the kernel level of the computing device's operating system, the present invention provides fast and efficient security that minimizes interruptions for the user. The first phase, the pre-execution process, performs a rapid validation check to determine whether the program has been approved for the computing device or network. If the program is validated, it can be run without further monitoring or interruptions for the user. If the program is not validated, it can be monitored at the kernel level of the operating system during the second phase, while the program is executing. Detection and monitoring modules of the present invention can identify suspicious activities triggered by the program and monitor the activities before they are able to cause harm to the computing device or network. In the event the program is initiating harmful activities, the protector software module can respond by taking remedial action to address the threat.

In one aspect, the present invention comprises a method for determining whether a program is approved to execute by comparing it to a predetermined list of approved programs. The operating system kernel notifies a pre-execution monitoring module when a new program begins to load so that it can be validated before execution. A validation module can compare the new program to the predetermined list of approved programs. If the new program is validated, the pre-execution monitoring module allows the operating system to continue loading and executing the program. Once a program is validated in the pre-execution phase, little or no additional security monitoring needs to be performed on the new program while it is executing. If the new program is not validated, the program can continue to load and execute, but other execution security modules are responsible for detecting, monitoring, and responding to suspicious activities. For example, the execution security modules can control access to certain files or registry settings, or limit network access. The execution security modules can also consider whether a new program was previously permitted to execute on the computing device.

In another aspect, the present invention provides a protector system for improving and expediting security on a computing device or network. The protector system comprises several software modules coupled to the operating system kernel of the computing device that manage and control activities at the kernel level. The protector system comprises a pre-execution monitoring component that can suspend a new program as it is loading into memory and before it can execute. The pre-execution monitoring component can operate with a validation module to determine whether the user has already validated the new program. If the pre-execution component validates the new program, it can continue to load and execute with minimal security concerns. However, if the pre-execution component is unable to validate the new program, execution security modules can perform additional monitoring while the new program is executing. Execution security modules can intercept various operating system triggers and calls before they are executed to determine if the activity is suspicious. If the program's activities are deemed suspicious or malicious, the execution security modules can respond by terminating the activities or taking other responsive measures to protect the security of the computing device or network.

These and other aspects of the invention will be described below in connection with the drawing set and the appended specification and claim set.

DETAILED DESCRIPTION OF THE EXEMPLARY EMBODIMENTS

Figure 1:
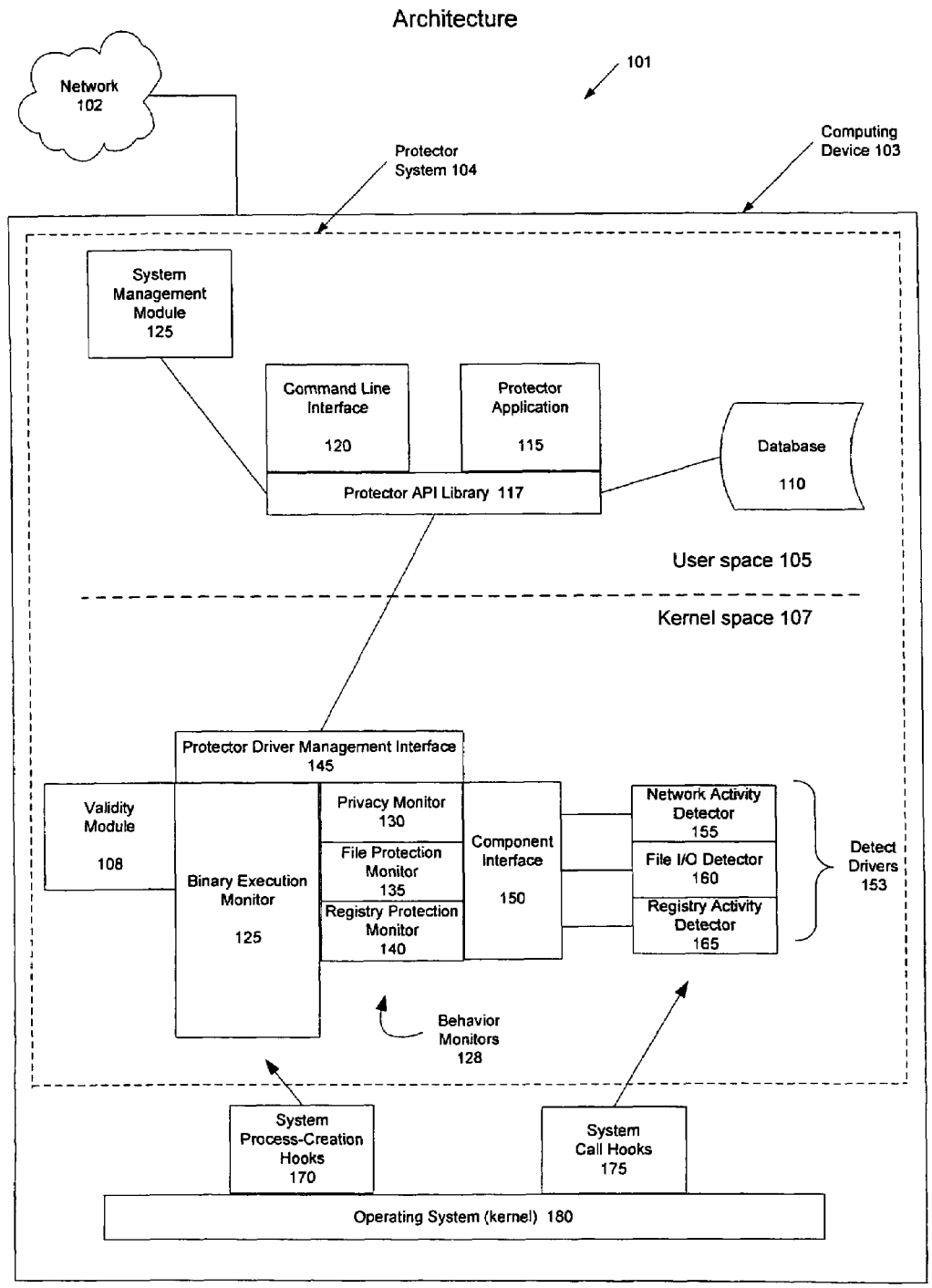
FIG. 1 is a block diagram illustrating an exemplary architecture for operating an embodiment of the present invention.

The present invention employs a protector system comprising several software modules to support the protection of computing devices and computing networks from malicious software programs. Specifically, the present invention employs a two-step process to validate software programs and monitor non-validated software programs. The two-step process provides an efficient and effective means for protecting a computing device or network while minimizing disruptions for the user. In the first phase of the process, the protector system validates authorized programs to ensure that they have not been corrupted before running them. For programs that cannot be validated, the protector system can monitor the programs as they execute during the second phase. If during the monitoring step, the program initiates any suspicious activities, the protector system can respond by taking one or more remedial actions.

Although the exemplary embodiments will be generally described in the context of software modules running in a distributed computing environment, those skilled in the art will recognize that the present invention also can be implemented in conjunction with other program modules for other types of computers. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet.

The detailed description that follows is represented largely in terms of processes and symbolic representations of operations in a distributed computing environment by conventional computer components, such as database servers, application servers, routers, security devices, firewalls, clients, workstations, memory storage devices, display devices and input devices. Each of these conventional distributed computing components is accessible via a communications network, such as a wide area network or local area network.

The processes and operations performed by the computer include the manipulation of signals by a client or server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

The present invention also includes computer programs that embody the functions described herein and illustrated in the appended flow charts. However, it should be apparent that there could be many different ways of implementing the invention in computer programming, and the invention should not be construed as limited to any one set of computer program instructions. Further, a skilled programmer would be able to write such a computer program to implement the disclosed invention based on the flow charts and associated description in the application text, for example. Therefore, disclosure of a particular set of program code instructions is not considered necessary for an adequate understanding of how to make and use the invention. The inventive functionality of the claimed computer program will be explained in more detail in the following description in conjunction with figures illustrating the program flow.

Referring now to the drawings, in which like numerals represent like elements throughout the several figures, aspects of the present invention and the preferred operating environment will be described.

FIG. 1 illustrates various aspects of an exemplary computing environment in which an embodiment of the present invention is designed to operate. Those skilled in the art will appreciate that FIG. 1 and the associated discussion are intended to provide a representative description of the computer components in an exemplary protector system.

Figure 1A:
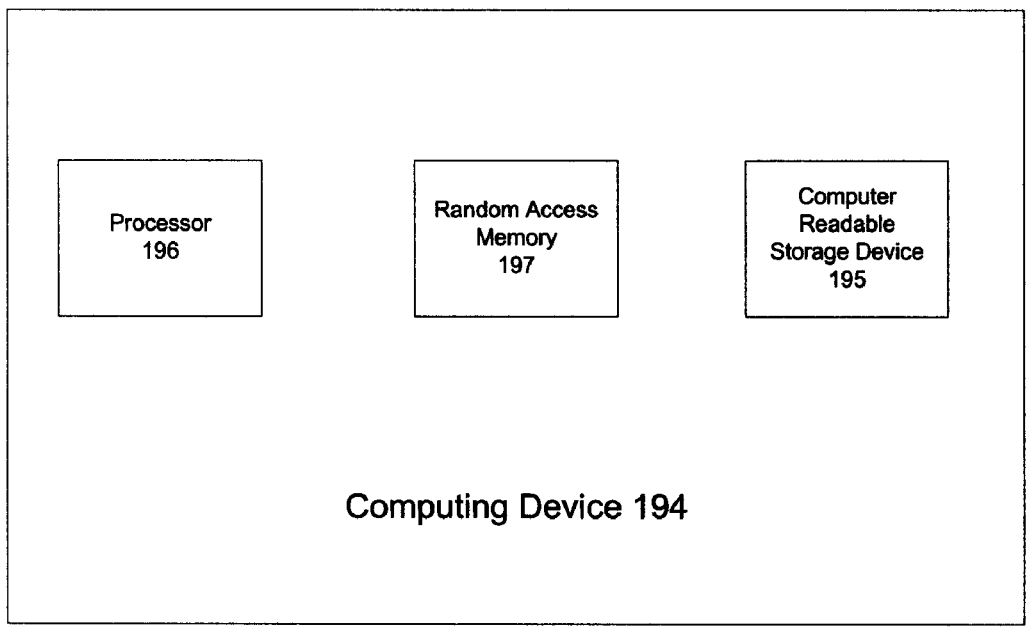

FIG. 1A illustrates aspects of an exemplary computing environment in which an embodiment of the invention is designed to operate. For example, exemplary computing device 194 can comprise software modules performing the processes described herein, wherein the software modules can be stored in exemplary computer-readable storage device 195 and be executed by exemplary processor 196 via exemplary random access memory 197. Computing device 194, computer-readable storage device 195, processor 196, and random access memory 197 are conventional computing components well known to those of ordinary skill in the art. Other embodiments of the invention may operate in other types of computing environments.

Referring to FIG. 1, an exemplary architecture 101 is illustrated for computing device 103. The exemplary computing device 103 is divided into two general regions referred to as the user space 105 and the kernel space 107. The kernel space 107 refers to the central part of the operating system 180. The kernel space 107 typically represents that portion of the operating system 180 that directly accesses the hardware of the computing device 103. In contrast, the user space 105 represents portions of the computing device 103 that interact with software and data received from outside the computing device 103. The exemplary architecture 101 shown in FIG. 1, illustrates the components of an exemplary protector system 104 that operates to protect the computing device 103 from rogue or malicious software.

Beginning with the user space 105, the system management module 125 manages security operations on the computing device 103 and can coordinate the functions of the protector system with other security devices that may be coupled to or operating on the computing device 103. If the computing device is coupled to a network 102, as shown in the exemplary architecture in FIG. 1, the system management module 125 can also be used to coordinate security settings and responses with other components on the network 102. The system management module 125 can also comprise a list of programs and processes that are allowed to run on the computing device 103.

In the user space 105, the command line interface 120 and the protector application 115 are coupled to the system management module 125. The command line interface 120 is typically implemented as a wrapper around the protector API library 117. The primary purpose of the command line interface 120 is to configure various security settings, such as how to respond to a certain threat, and to load the settings into the protector driver management interface 145. The protector application 115 communicates with the protector driver management interface 145 via the API library 117 and provides user-level services in the protector system 104. The protector application 115 can provide the initial configuration load when the protector system 104 is initialized and can interact with a user on certain security decisions. The protector application 115 also interacts with database 110. The database 110 can comprise various data used in performing protector security functions, which will be described in greater detail in connection with FIG. 2.

Communication between the user space 105 and the kernel space 107 is performed with the API library 117 and the protector driver management interface 145. The API library is preferably implemented as a C level application programming interface that allows various processes to maintain the data in database 110 and provide instructions to the drivers in the kernel space 107.

The binary execution monitor 125 implements the primary functions of the protector system 104. The binary execution monitor 125 is an in-kernel driver that monitors the loading of binary executable files and other executable libraries in real time by recognizing and validating any executable file that is being loaded. Validation of an executable file is implemented with the validity module 108 and can be performed using a variety of techniques described in greater detail herein. When the binary execution monitor 125 is installed, it establishes the presence of its processing at the system process-creation hooks 170 within the kernel where it can observe all process and creation activities. When a program is initially loaded into memory in anticipation of execution, the binary execution monitor 125 works with the validity module 108 to validate the program. Using the system process-creation hooks 170, the binary execution monitor 125 can recognize the initial loading of executable files, and any subsequent loading of executable libraries that can occur while a program is executing. The binary execution monitor's 125 functions performed prior to execution of an executable file can also be generally described as being performed by a pre-execution module of the protector system 104.

If the binary execution monitor 125 is unable to validate a program, the detect drivers 153 can monitor the non-validated program when it is executing and identify potential threats to the computing device 103 before they are executed. The detect drivers 153 are plug-in modules linked to the system call hooks 175 within the kernel. The detect drivers 153 communicate system call hooks, using component interface 150, to associated behavior monitoring modules 128 that can react to the suspicious activities. The binary execution monitor 125 also works in conjunction with the behavior monitoring modules 128 to analyze and respond to system call hooks communicated from the detect drivers 153. The behavior monitoring modules 128 are a collection of in-kernel modules that are associated with the detect drivers 153. For example, the privacy monitor 130 reacts to a program's attempt to use a network connection to other computer systems. The file protection monitor 135 can react to an attempt to alter a specified file. The registry protection monitor 140 protects against unauthorized changes to registry settings. Generally, the behavior monitors 128 can take direct action to address a security threat or instruct the protector application 115 to query the user for instructions on how to handle the threat. Other behavior monitors 128 and their associated detect drivers 153 can be plugged into the protector system 104 to implement different security functions. Furthermore, those skilled in the art will understand that the architecture 101 of the protector system 104 shown in FIG. 1 is an example and that various components can be located external to the computing device 103 or on the network 102 in other embodiments. The functions of the binary execution monitor 125, the detect drivers 153, and the behavior monitors 128 performed during execution of an executable file can generally be referred to as being performed by an execution module of the protector system 104.

Figure 2:
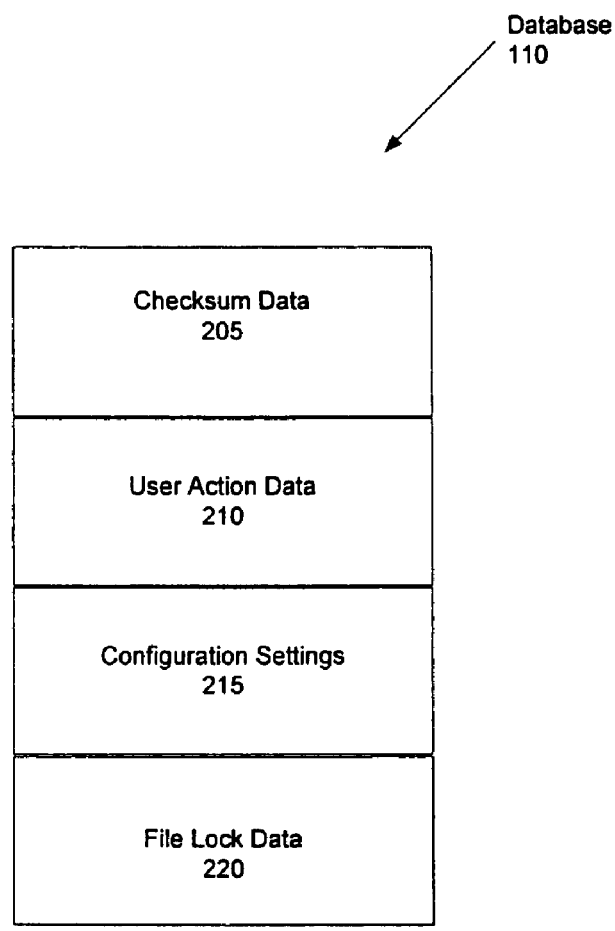
FIG. 2 is a block diagram illustrating components of a database implemented in accordance with an exemplary embodiment of the present invention.

FIG. 2 illustrates components of the database 110 in accordance with an exemplary embodiment of the protector system 104. The exemplary database 110 comprises checksum data 205, user action data 210, configuration settings 215, and file lock data 220. The checksum data 205 comprises data for each executable that is permitted to run on the computing device 103. The checksum data 205 is used to validate executable files before they are run on the computing device 103. The user action data 210 comprises a record of the user's responses to the introduction of a new executable on the computing device 103. For example, an executable being loaded onto the computing device 103 may not be on a list of allowed programs. If this executable has previously been loaded onto the computing device 103 and the user has been queried as to whether or not the executable is allowed to run, the user's response to this query can be stored in the user action data 210. The configuration settings 215 comprise settings that can be controlled by the user for determining how the protector system 104 will respond to new or suspicious programs being loaded onto the computing device 103. The file lock data 220 represents files selected by the user or network administrator that are to be restricted from access by programs running on the computing device 103. As illustrated in greater detail in the discussion associated with FIG. 7, the file protection monitor 140 can use the file lock data 220 to protect certain files from being accessed.

Figure 3:
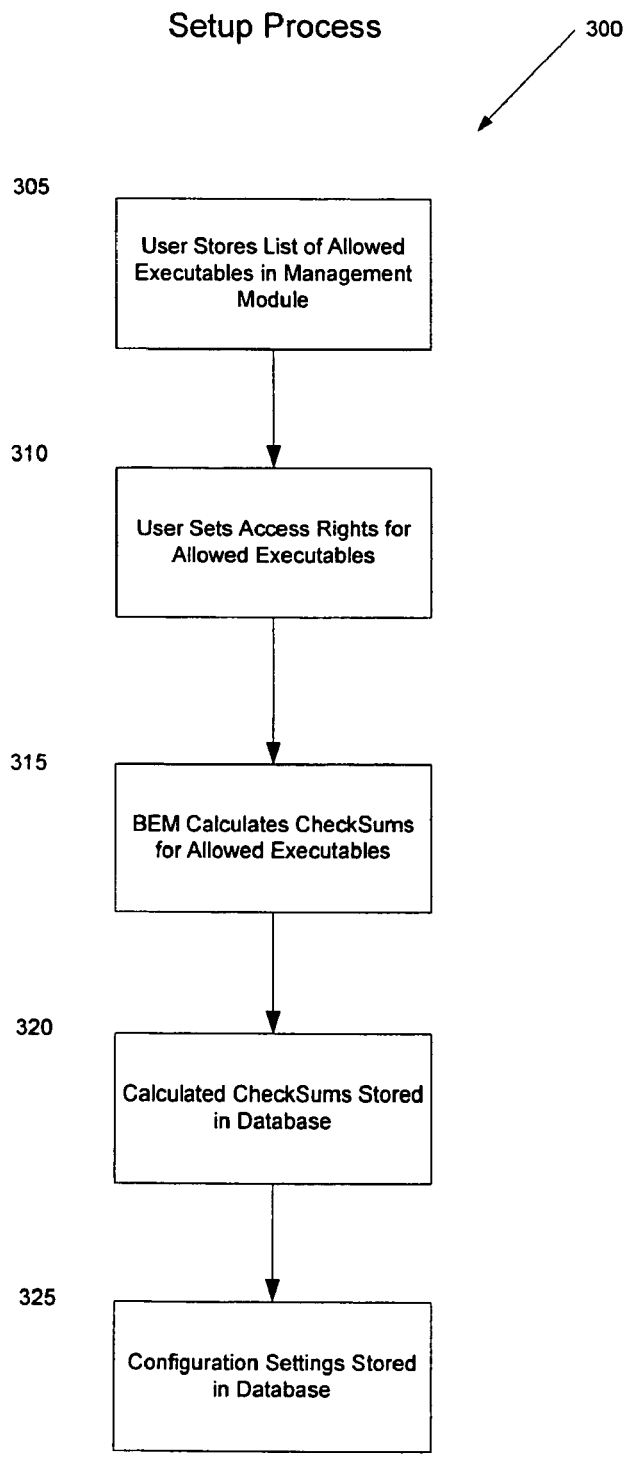
FIG. 3 is a logic flow diagram illustrating a setup process for implementing the protector system in accordance with an exemplary embodiment of the present invention.

Referring to FIG. 3, an exemplary setup process 300 is illustrated. The setup process 300 is typically performed prior to the protector system 104 operating on the computing device 103. In step 305 of exemplary process 300, the user stores a list of allowed executable files in the system management module 125. This list of allowed executable files is associated with programs that are approved to run on the computing device 103. The list of allowed executable files may be defined by the user or by a network manager if the computing device 103 is coupled to a network, such as in a workplace environment. In step 310, the user can set access rights for each of the allowed executable files. The access rights for the allowed executable files define which components of the computing device 103, or the network to which the computing device is coupled, may be accessed by that executable. Defining access rights can also include defining which files are restricted from access.

Steps 315 and 320 provide specific examples of validation steps conducted during the setup process using the validity module 108. The binary execution monitor 125 works with the validity module 108 to validate each of the allowed executable files. The validation module 108 can be any one of a variety of pieces of software that are used to verify that a program has not been tampered with. For example, the validation module can represent the MD5 software module commonly known to those in the art. The MD5 software module calculates a checksum for each allowed program and that checksum is stored for later comparison. As described in connection with FIG. 2, the checksum data 205 can be stored in database 110 in step 320.

Finally, in step 325 of the setup process 300, the configuration settings chosen by the user are stored in the database 110. The configuration settings can be chosen by the user of the computing device 103 or by a network administrator if the computing device 103 is coupled to a network. The configuration settings can include predetermined responses to particular threats and decision rules as to when the user should be queried about a security threat.

The subject matter of the remaining drawings, FIGS. 4A, 4B, 5, 6 and 7, generally can be categorized in two phases of execution of a program. The first phase, called pre-execution, occurs as a program is being loaded into memory, but before it can execute. The second phase is the execution process for the program. One advantage of the protector system 104 is that it performs the majority of the security decision-making in the pre-execution process illustrated in FIGS. 4A, 4B and 5. By moving much of the security decision-making to the pre-execution process, the protector system 104 enables the execution process, represented by FIGS. 6 and 7, to run more smoothly and with fewer interruptions for the user.

Figure 4A:
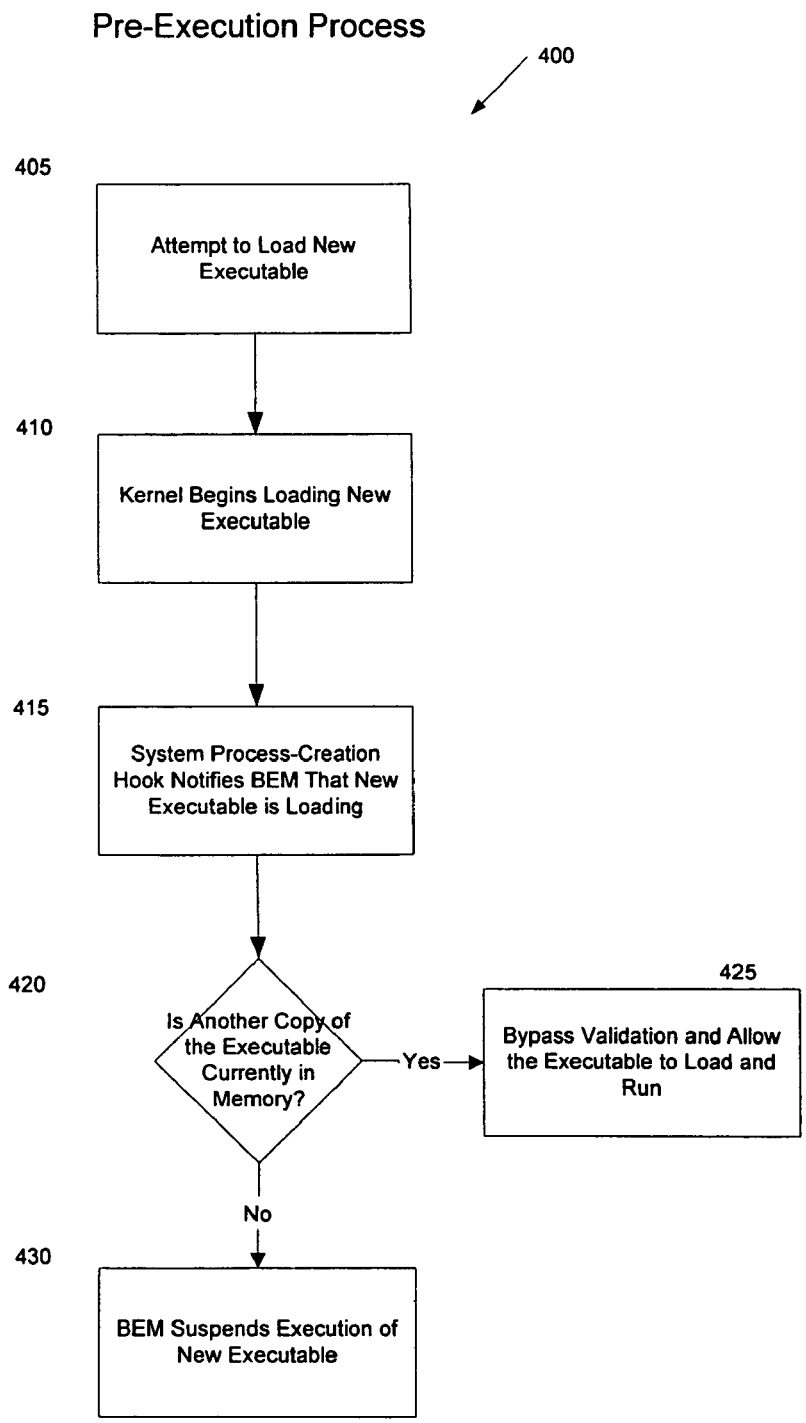
FIGS. 4A and 4B are logic flow diagrams illustrating a pre-execution process using the protector system in accordance with an exemplary embodiment of the present invention.
Figure 4B:
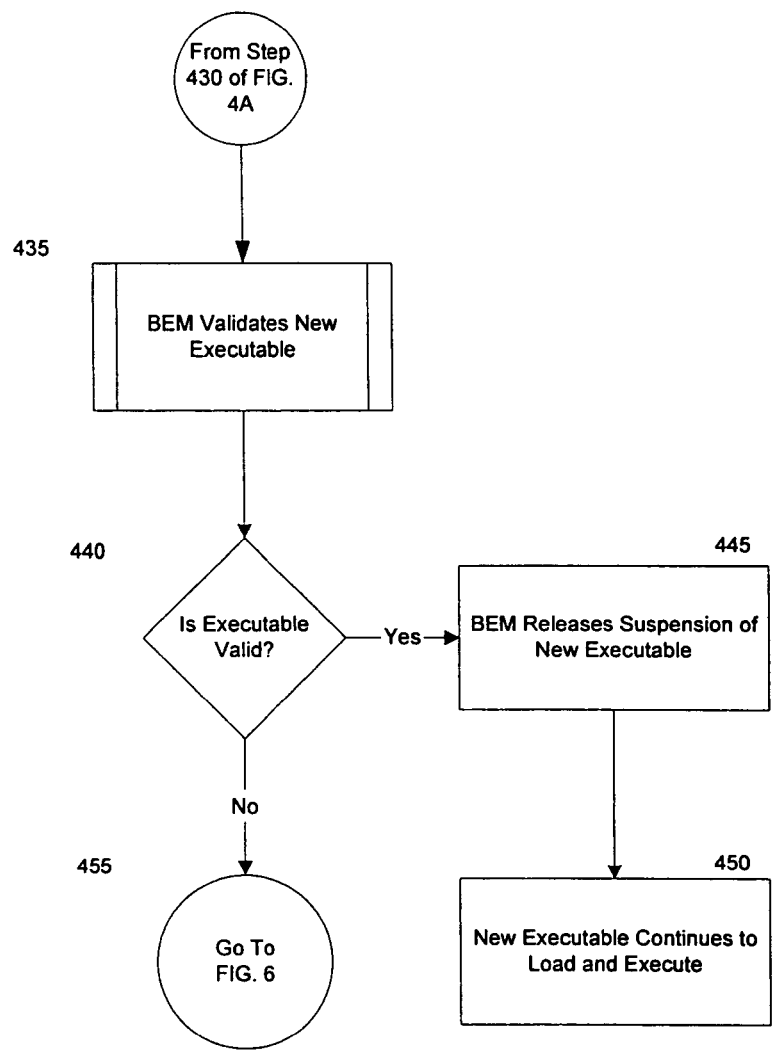

Referring to FIG. 4A, an exemplary process 400 is illustrated for performing the steps in the pre-execution phase for an executable file. Beginning with step 405, the user, or another software module, may attempt to load a new executable file for running on the computing device 103. In step 410, the kernel begins loading the new executable file into memory in anticipation of running the program. As the executable file is loading, a system process-creation hook 170 notifies the binary execution monitor 125 of the loading process. By initiating the monitoring process at the kernel level, the protector system 104 is able to begin performing its functions before the program can execute and cause possible harm.

In step 420, the kernel will determine whether this executable is already running on the computing device 103. If in fact the executable is running, the "yes" branch is followed to step 425 and the executable will not be loaded. If the executable is already running, it has been approved previously and the protector system 104 can skip the validation process described in connection with FIG. 4B. If however, the executable has not already been loaded, the binary execution monitor 125 will respond to the system process-creation hook 170 by suspending execution of the executable file, in step. 430, until the program can be validated.

The pre-execution process performed by the binary execution monitor 125 and the other associated components of the protector system 104 supports an initial determination of whether the new executable is safe for loading onto the computing device 103. Continuing with FIG. 4B, step 435 illustrates a representative step for validating the new executable. Step 435 will be described in greater detail in one exemplary embodiment in the discussion in connection with FIG. 5 below. In step 440, if the binary execution monitor 125 is able to validate the new executable, the suspended state will be released in step 445 and loading of the executable will continue in step 450. However, if the binary execution monitor 125 is unable to validate the executable in the pre-execution process, additional precautionary steps will have to be taken in the execution phase as described in greater detail in connection with FIGS. 6 and 7.

Figure 5:
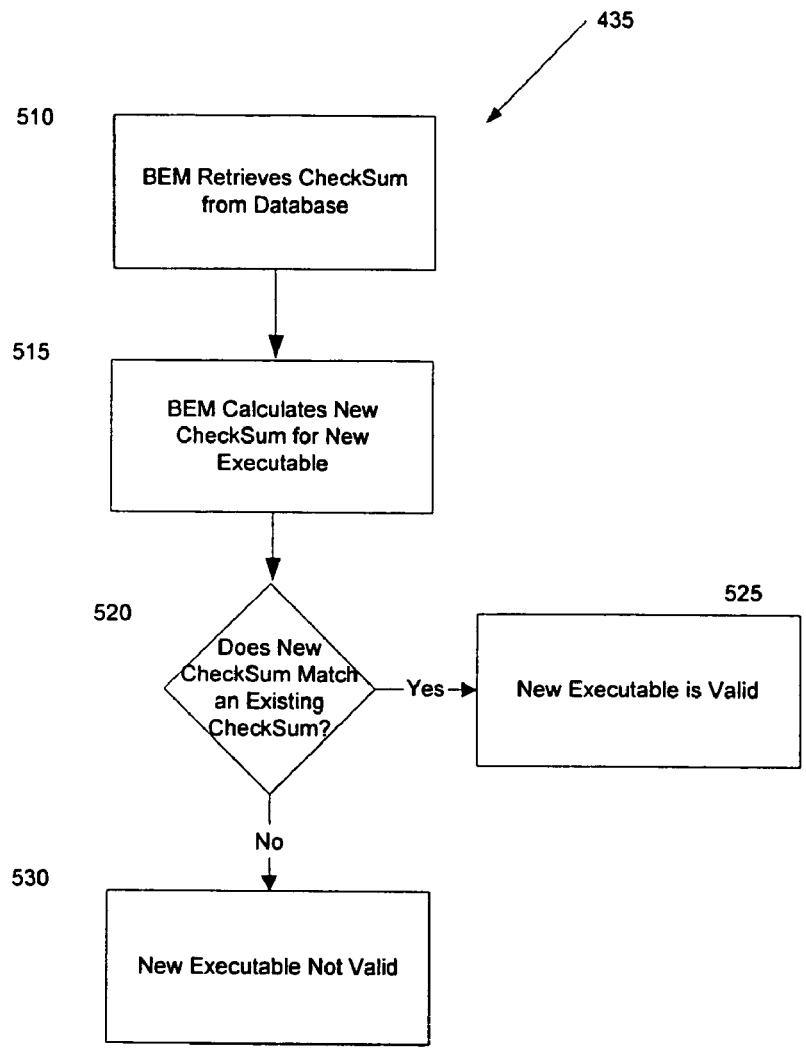
FIG. 5 is a logic flow diagram illustrating a validation process using the protector system in accordance with an exemplary embodiment of the present invention.

Referring to FIG. 5, the exemplary process referred to in step 435 is illustrated in greater detail. As mentioned earlier, the checksum technique illustrated in FIG. 5 is only one example of a method for validating an executable. Other validation techniques can use various software modules to analyze the behavior or characteristics of certain executable files in order to validate them. In step 510, the binary execution monitor 125 retrieves the checksum data that was previously calculated and stored in database 110. In step 515, the binary execution monitor 125 calculates a checksum for the new executable which is being loaded on the computing device 103. If the executable is associated with an allowed program, and the program has not been corrupted, the binary execution monitor 125 should find a match between the data contained in the checksum data 205 and the checksum calculated for the new executable. If the binary execution monitor 125 finds a match with the checksum data, the new executable will be found to be valid in step 525. If the program associated with the new executable is not one of the allowed programs designated during the setup process 300, then the executable is found to be not valid in step 530. Additionally, if the executable corresponds to an allowed program but the program has in someway been corrupted, the checksum calculated for the new executable will not match the previously calculated checksum and the new executable is found to be not valid in step 530.

Figure 6:
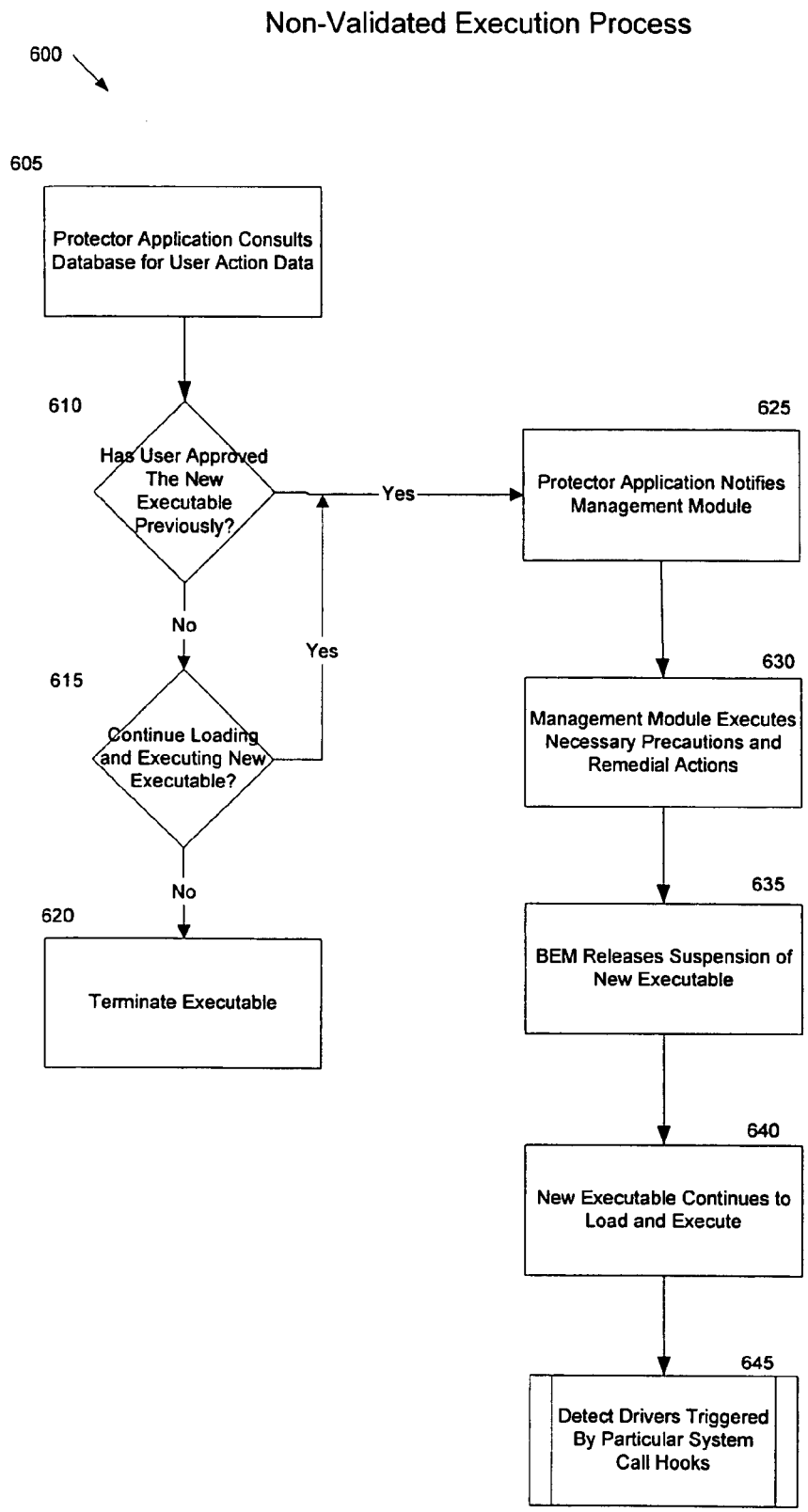
FIG. 6 is a logic flow diagram illustrating a non-validated execution process using the protector system in accordance with an exemplary embodiment of the present invention.
Figure 7:
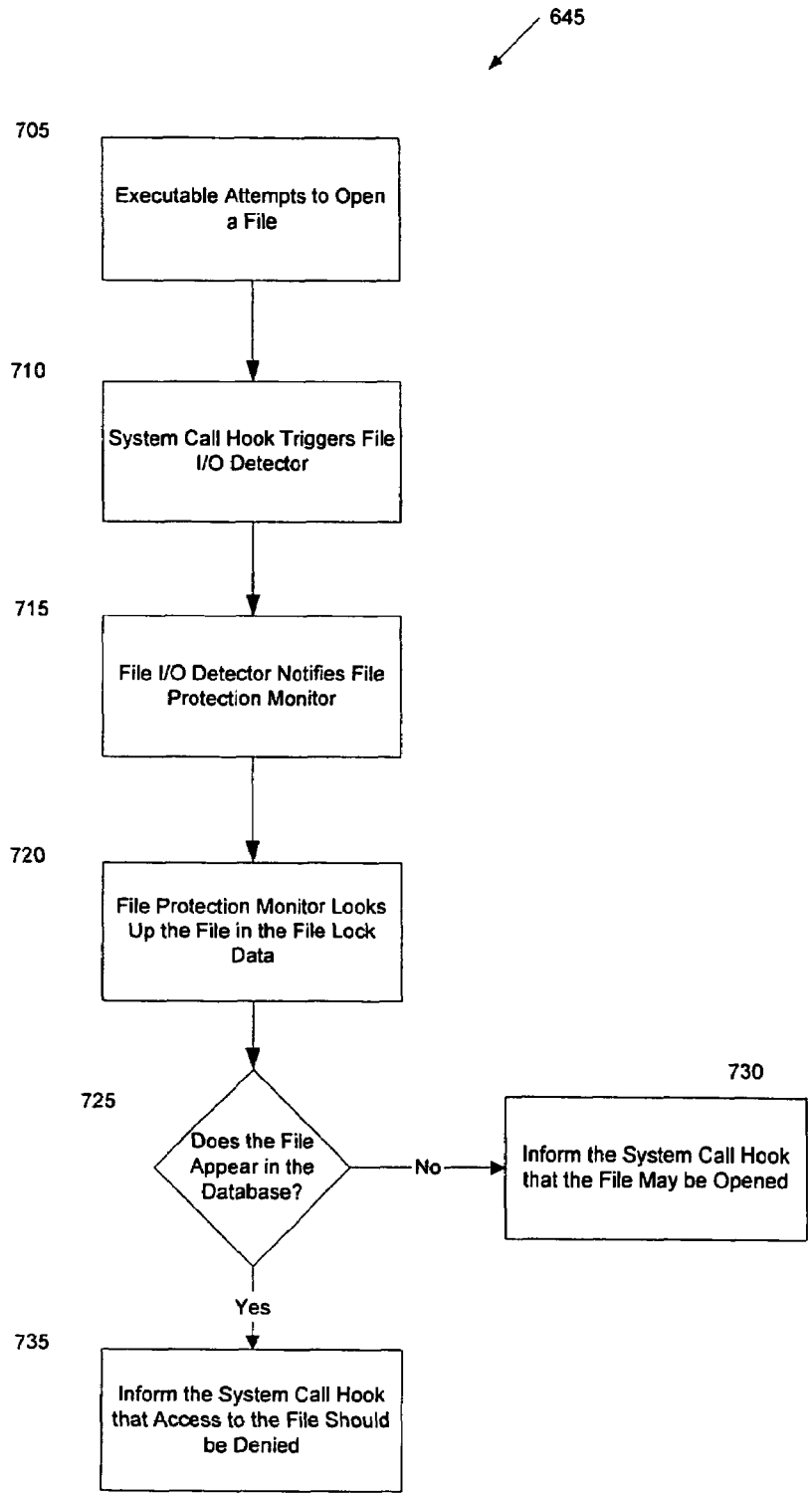
FIG. 7 is a logic flow diagram illustrating a file protection process using the protector system in accordance with an exemplary embodiment of the present invention.

As mentioned above, the exemplary processes illustrated in FIG. 6 and FIG. 7 occur after the pre-execution process and concern executable files that the binary execution monitor 125 could not not validate in the pre-execution phase. Referring to FIG. 6, an exemplary process 600 is illustrated for executing an executable file that has not been validated. Once the pre-execution process 400 terminates and the suspended state is lifted, in step 605 the protector application 115 will consult the database 110 to determine if the user has been previously queried about the new non-validated executable file. If the user has been previously queried about this executable and the previous decision was to not allow this executable file to load, the executable will be terminated in step 620 without interrupting the user for a decision. If the user has previously approved the loading of this executable file in step 610, or, if the user approves the new executable in this instance in step 615, then execution of the executable file will proceed.

Although the user has allowed the non-validated executable file to proceed, the protector system 104 will take steps to protect the computing device 103 and the network 102 that it may be connected to. Steps 625 through 645 illustrate exemplary processes that may be performed in allowing the non-validated executable file to proceed. In step 625, the protector application 115 will notify the system management module 125 that the non-validated executable file is allowed to execute. This notification will serve to allow the system management module 125 to take any precautions, in step 630, to protect other components of the computing device 103 or other network components coupled to the computing device. In step 635, the binary execution monitor 125 will release the suspended state for the new executable and the program will continue to load and execute in step 640.

As the program is executing, the other components of the protector system 104, such as the detect drivers 153 and the behavior monitoring modules 128, operate to prevent the non-validated program from performing any malicious activities on the computing device 103 or on the network 102. The detect drivers 153 are linked to the kernel activities through system call hooks 175. In step 645, certain activities performed by the program will trigger system call hooks that, in turn, trigger the detect drivers 153. The detect drivers 153 are then coupled to the behavior monitoring modules 128, which can observe the program's behavior and respond to any malicious activity. An exemplary process 645 for triggering a detect driver 153 is illustrated in greater detail in FIG. 7.

Referring to FIG. 7, an exemplary detection process 645 is illustrated that employs the file input/output detector 160. The exemplary process 645 is illustrative of the operations of detect drivers 153 and their associated behavior monitors 128. In step 705, the executable file attempts to open a file in connection with a process or activity it is performing. As the kernel attempts to follow the instruction of the executable and open the file, the system call hook 175 linked to this activity triggers the file input/output detector 160 in step 710. The file input/output detector 160, in turn, notifies the file protection monitor 135 in step 715.

Any files that have restricted access, as determined by the user or network administrator in the setup process 300, will be identified in the file lock data in database 210. The file protection monitor 135 consults the file lock data in step 720 to determine whether the subject file has been restricted. If the file is not restricted, the file protection monitor 135 permits the system call hook 175 to proceed with opening the file. However, if the file does appear in the file lock data 220 in step 735, the file protection monitor can limit access to the file. For instance, the file protection monitor can provide read-only access to a file or can prohibit access entirely.

In other examples of how the behavior monitors function, the type of response can depend on the type of activity that is detected as well as the configuration settings 215 selected by the user or the network administrator. For instance, if the program is attempting to perform functions that may seriously impair the computing device 103 or the network 102, the protector system 104 may immediately terminate execution of the program. Alternatively, if the file protection monitor 135 determines that the threat is less severe, the protector application 115 may simply query the user to insure that it is safe to continue executing the program.

In conclusion, the present invention enables and supports security from malicious software programs for a computing device or computing network. The two-step process of the protector system provides an effective and efficient method for implementing security while minimizing the burdens and interruptions for the user. The pre-execution process provides an efficient method for determining whether an uncorrupted program is allowed to execute. By validating certain programs during the pre-execution process, the protector system minimizes the amount of work that must be done in monitoring and controlling programs during the execution phase. The validation step also reduces the number of false positive alarms, thereby reducing security interruptions for the user.

It will be appreciated that the present invention fulfills the needs of the prior art described herein and meets the above-stated objects. While there has been shown and described the preferred embodiment of the invention, it will be evident to those skilled in the art that various modifications and changes may be made thereto without departing from the spirit and the scope of the invention as set forth in the appended claims and equivalence thereof. Although the present invention has been described as operating on a computing device coupled to a network, it should be understood that the invention can be applied to other types of distributed computing environments. Furthermore, it should be readily apparent that the components of the protector system can be located in various local and remote locations of a distributed computing environment.

What is claimed is:

1. A computer-implemented method for implementing security for a computing device comprising the steps of:
   receiving a notification that a new program is intended for execution on the computing device;
   determining automatically whether the new program is substantially the same as a program which was previously approved for execution on the computing device;
   permitting the new program to execute on the computing device similarly to the approved program in response to the new program being substantially the same as the approved program; and
   monitoring the execution of the new program at an operating system kernel by permitting the new program to execute on the computing device in response to the new program not being substantially the same as the approved program, wherein the new program is prevented from accessing a specific type of file, using a specific registry setting or making a specific type of network communication that was permitted to the approved program.

2. The computer-implemented method of claim 1, further comprising the steps of computing a checksum for the new program; and comparing the checksum for the new program to a checksum for the program which was previously approved for execution on the computing device.

3. The computer-implemented method of claim 1, further comprising the step of determining if the new program has been modified.

4. The computer-implemented method of claim 1, further comprising the step of terminating execution of the new program in response to the new program performing suspicious activities.

5. A computer system for implementing security for a computing device, said system comprising:
   a processor, a random access memory, and a storage device;
   first program instructions for receiving a notification that a new program is intended for execution on the computing device;
   second program instructions for automatically determining whether the new program is substantially the same as a program which was previously approved for execution on the computing device;
   third program instructions, responsive to the new program being substantially the same as the approved program, for permitting the new program to execute on the computing device similarly to the approved program;
   fourth program instructions, responsive to the new program not being substantially the same as the approved program, for monitoring the execution of the new program at an operating system kernel by permitting the new program to execute on the computing device while preventing the new program from accessing a specific type of file, using a specific registry setting or making a specific type of network communication that was permitted to the approved program; and
   wherein the first, second, third, and fourth program instructions are stored in the storage device for execution by the processor via the random access memory.

6. The computer system of claim 5, wherein the second program instructions comprise program instructions for computing a checksum for the new program, and comparing the checksum for the new program to a checksum for the program which was previously approved for execution on the computing device.

7. The computer system of claim 5, wherein the second program instructions comprise program instructions for determining if the new program has been modified.

8. The computer system of claim 5, wherein the fourth program instructions comprise program instructions for terminating execution of the new program in response to the new program performing suspicious activities.

9. A computer-readable storage media for implementing security for a computing device, said computer-readable storage media comprising:
   first program instructions to receive a notification that a new program is intended for execution on the computing device;
   second program instructions to automatically determine whether the new program is substantially the same as a program which was previously approved for execution on the computing device;
   third program instructions, responsive to the new program being substantially the same as the approved program, to permit the new program to execute on the computing device similarly to the approved program; and
   fourth program instructions, responsive to the new program not being substantially the same as the approved program, to monitor the execution of the new program at an operating system kernel by permitting the new program to execute on the computing device while preventing the new program from accessing a specific type of file, using a specific registry setting or making a specific type of network communication that was permitted to the approved program; and wherein said first, second, third and fourth program instructions are stored in said computer-readable storage media.

10. The computer-readable storage media of claim 9, wherein the second program instructions comprise program instructions to compute a checksum for the new program, and to compare the checksum for the new program to a checksum for the program which was previously approved for execution on the computing device.

11. The computer-readable storage media of claim 9, wherein the second program instructions comprise program instructions to determine if the new program has been modified.

12. The computer-readable storage media of claim 9, wherein the fourth program instructions comprise program instructions to terminate execution of the new program in response to the new program performing suspicious activities.

* * * * *